(12) United States Patent
Lee et al.

(10) Patent No.: US 10,764,837 B2
(45) Date of Patent: Sep. 1, 2020

(54) METHOD FOR TRANSMITTING D2D DISCOVERY SIGNAL BY TERMINAL IN WIRELESS COMMUNICATION SYSTEM AND TERMINAL USING SAME METHOD

(71) Applicant: LG ELECTRONICS INC., Seoul (KR)

(72) Inventors: Seungmin Lee, Seoul (KR); Hanbyul Seo, Seoul (KR); Suhwan Lim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/397,676

(22) Filed: Apr. 29, 2019

(65) Prior Publication Data

US 2019/0253982 A1 Aug. 15, 2019

Related U.S. Application Data

(63) Continuation of application No. 15/546,536, filed as application No. PCT/KR2016/000863 on Jan. 27, 2016, now Pat. No. 10,349,360.

(Continued)

(51) Int. Cl.
*H04W 52/30* (2009.01)
*H04W 52/32* (2009.01)
(Continued)

(52) U.S. Cl.
CPC ........... *H04W 52/30* (2013.01); *H04L 5/0092* (2013.01); *H04W 4/70* (2018.02); *H04W 8/00* (2013.01);
(Continued)

(58) Field of Classification Search
CPC combination set(s) only.
See application file for complete search history.

(56) References Cited

U.S. PATENT DOCUMENTS 10,231,193 B2 3/2019 Lee et al.
10,264,437 B2 * 4/2019 Poitau ................... H04W 76/14
(Continued)

FOREIGN PATENT DOCUMENTS

CN 103384161 A 11/2013
CN 103997727 A 8/2014
(Continued)

OTHER PUBLICATIONS

LG Electronics, "Discussion on D2D Transmission Power", 3GPP TSG RAN WG1 Meeting #80, R1-150492, Athens, Greece, Feb. 9-13, 2015, pp. 1-5.
(Continued)

*Primary Examiner* — Dominic E Rego
(74) *Attorney, Agent, or Firm* — Birch, Stewart, Kolasch & Birch, LLP

(57) ABSTRACT

A method for transmitting a sidelink discovery signal in a wireless communication system, the method is performed by a user equipment (UE) and includes: determining a transmit power for the sidelink discovery signal, and transmitting the sidelink discovery signal with the transmit power, wherein the transmit power is determined based on discMaxTx-Power, and wherein the discMaxTxPower informs a parameter used to calculate a maximum transmit power of the UE configured with a concerned range class.

10 Claims, 21 Drawing Sheets

Related U.S. Application Data

(60) Provisional application No. 62/108,529, filed on Jan. 27, 2015, provisional application No. 62/109,635, filed on Jan. 30, 2015, provisional application No. 62/114,005, filed on Feb. 9, 2015, provisional application No. 62/165,952, filed on May 23, 2015, provisional application No. 62/169,544, filed on Jun. 1, 2015.

(51) Int. Cl.
  *H04W 52/34* (2009.01)
  *H04W 52/36* (2009.01)
  *H04W 52/38* (2009.01)
  *H04W 4/70* (2018.01)
  *H04W 40/24* (2009.01)
  *H04W 8/00* (2009.01)
  *H04W 76/14* (2018.01)
  *H04L 5/00* (2006.01)

(52) U.S. Cl.
  CPC ....... *H04W 52/322* (2013.01); *H04W 52/325* (2013.01); *H04W 52/346* (2013.01); *H04W 52/367* (2013.01); *H04W 52/383* (2013.01); *H04W 76/14* (2018.02); *H04L 5/0032* (2013.01); *H04W 8/005* (2013.01); *H04W 40/246* (2013.01)

(56) References Cited

U.S. PATENT DOCUMENTS

| | | | |
|---|---|---|---|
| 10,542,501 | B2 | 1/2020 | Lee et al. |
| 2010/0317291 | A1 | 12/2010 | Richardson |
| 2012/0250531 | A1* | 10/2012 | Patil .................. H04W 8/005 370/252 |
| 2013/0178221 | A1 | 7/2013 | Jung et al. |
| 2013/0287012 | A1* | 10/2013 | Pragada .............. H04W 76/25 370/338 |
| 2013/0310103 | A1 | 11/2013 | Madan et al. |
| 2013/0324182 | A1 | 12/2013 | Deng et al. |
| 2014/0016615 | A1 | 1/2014 | Nanri et al. |
| 2014/0064147 | A1 | 3/2014 | Wang et al. |
| 2014/0295829 | A1* | 10/2014 | Turtinen ............. H04W 8/005 455/426.1 |
| 2014/0301228 | A1 | 10/2014 | Kwak et al. |
| 2014/0302791 | A1 | 10/2014 | Mok et al. |
| 2014/0302855 | A1 | 10/2014 | Nory et al. |
| 2014/0355574 | A1* | 12/2014 | Turtinen ........... H04W 72/1278 370/336 |
| 2014/0376458 | A1* | 12/2014 | Ryu .................... H04W 72/085 370/329 |
| 2015/0049649 | A1 | 2/2015 | Zhu et al. |
| 2015/0071114 | A1* | 3/2015 | Gulati ................... H04W 4/70 370/254 |
| 2015/0078297 | A1* | 3/2015 | Zheng .................. H04W 76/14 370/329 |
| 2015/0117247 | A1* | 4/2015 | Wang .................... H04W 24/08 370/252 |
| 2015/0208358 | A1 | 7/2015 | Ahn et al. |
| 2015/0215903 | A1 | 7/2015 | Zhao et al. |
| 2015/0223141 | A1* | 8/2015 | Chatterjee .......... H04W 40/246 370/329 |
| 2015/0304957 | A1 | 10/2015 | Noh et al. |
| 2016/0014834 | A1* | 1/2016 | Chang .................. H04W 76/14 370/329 |

FOREIGN PATENT DOCUMENTS

| | | |
|---|---|---|
| CN | 104244265 A | 12/2014 |
| EP | 2 768 262 A1 | 8/2014 |
| WO | WO 2013/108114 A1 | 7/2013 |
| WO | WO 2014/021612 A2 | 2/2014 |
| WO | WO 2014/105387 A1 | 7/2014 |
| WO | WO 2014/133703 A1 | 9/2014 |
| WO | WO 2014/163335 A1 | 10/2014 |
| WO | WO 2014/180518 A1 | 11/2014 |
| WO | WO 2015/005751 A1 | 1/2015 |

OTHER PUBLICATIONS

LG Electronics, "Text Proposal for Sidelink Transmission Power", 3GPP TSG RAN WG1 Meeting #80, R1-150758, Athens, Greece, Feb. 9-13, 2015, 5 pages.

Nokia Corporation et al., "Discussions on PSBCH", 3GPP TSG-RAN WG1 Meeting #78bis, R1-144164, Ljubljana, Slovenia, Oct. 6-10, 2014, 5 pages.

Nokia Corporation et al., "On Remaining Details of Power Control for D2D Transmissions", 3GPP TSG-RAN WG1 Meeting #79, R1-144982, San Francisco, USA, Nov. 17-21, 2014, 3 pages.

Samsung, "Transmission Power of Discovery and Communication", 3GPP TSG RAN WG1 Meeting #78, R1-143282, Dresden, Germany, Aug. 18-22, 2014, pp. 1-2.

Qualcomm Incorporated, "Remaining Issues for D2D," 3GPP TSG-RAN WG1 #79, R1-145222, San Francisco, USA, Nov. 17-21, 2014, 16 pages.

\* cited by examiner

D2D SIGNAL TX (a): case (1)  (b): case (2)

METHOD FOR TRANSMITTING D2D DISCOVERY SIGNAL BY TERMINAL IN WIRELESS COMMUNICATION SYSTEM AND TERMINAL USING SAME METHOD

CROSS REFERENCE TO RELATED APPLICATIONS

This Application is a Continuation Application of U.S. patent application Ser. No. 15/546,536 filed on Jul. 26, 2017, which is the National Phase of PCT International Application No. PCT/KR2016/000863, filed on Jan. 27, 2016, which claims priority under 35 U.S.C. 119(e) to U.S. Provisional Application No. 62/108,529, filed on Jan. 27, 2015, U.S. Provisional Application No. 62/109,635, filed on Jan. 30, 2015, U.S. Provisional Application No. 62/114,005, filed on Feb. 9, 2015, U.S. Provisional Application No. 62/165,952, filed on May 23, 2015, and U.S. Provisional Application No. 62/169,544, filed on Jun. 1, 2015, all of which are hereby expressly incorporated by reference into the present application.

BACKGROUND OF THE INVENTION

Field of the Invention

The present invention relates to wireless communication, and more particularly, to a method of transmitting a device-to-device (D2D) discovery signal by a user equipment (UE) in a wireless communication system, and the UE using the method.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced (LTE-A) is one of promising candidates for the IMT-advanced.

Meanwhile, recently, there is a growing increase in a device-to-device (D2D) technique for performing direct communication between devices. In particular, the D2D is drawing attention as a communication technique for a public safety network. Although a commercial communication network is rapidly changing to LTE, the public safety network is primarily based on a 2G technique at present in terms of costs and a problem of a collision with the conventional communication protocol. Such a technical gap and a demand on an improved service results in an effort of improving the public safety network.

The public safety network has a higher service requirement (reliability and safety) in comparison with the commercial communication network, and in particular, even if cellular communication is performed in an out-of-coverage state or is not available, also demands direct signal transmission/reception between devices, i.e., a D2D operation.

The D2D operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

Meanwhile, the D2D operation includes D2D discovery and D2D communication. The D2D discovery is a procedure used when a proximity service-enabled UE discovers another proximity service-enabled UE. The D2D communication is a procedure for directly exchanging data between proximate UEs. Which method will be used to determine transmit power is a matter to be considered when transmitting a signal for the D2D discovery.

Further, transmission of a synchronization signal and a broadcast signal is necessary for the D2D discovery and the D2D communication. The synchronization signal for the D2D communication is referred to as a sidelink synchronization signal (SLSS or SSS) to distinguish from a synchronization signal used between a base station and a UE in the conventional wide area network (WAN). For the same reason, the broadcast channel for the D2D communication is referred to as a physical sidelink broadcast channel (PSBCH).

The SLSS/PSBCH may be expressed as being triggered for the D2D discovery when it is transmitted for the D2D discovery, and may be expressed as being triggered for the D2D communication when it is transmitted for the D2D communication. When the SLSS/PSBCH is triggered simultaneously for both of the D2D discovery and the D2D communication, how to determine transmit power of the SLSS/PSCBH may be a matter to be considered.

SUMMARY OF THE INVENTION

An object of the present invention is to provide a method of transmitting a device-to-device (D2D) discovery signal, performed by a user equipment (UE), in a wireless communication system, and the UE using the method. In addition, there is provided a method of transmitting a sidelink synchronization signal and a physical sidelink broadcast channel, and a UE using the method.

In one aspect, provided is a method of transmitting a device-to-device (D2D) discovery signal, performed by a user equipment (UE), in a wireless communication system. The method includes receiving power information discMaxTxPower for D2D discovery signal transmission and determining transmit power PPSDCH for the D2D discovery signal transmission on the basis of the power information discMaxTxPower.

The D2D discovery signal may be transmitted with the transmit power PPSDCH determined on the basis of the power information discMaxTxPower.

The power information discMaxTxPower may be received via a different system information block other than a system information block for receiving power information P-Max for D2D communication.

A range class may be configured to the UE, and the range class indicates any one of short, medium and long.

The power information discMaxTxPower may indicate maximum transmit power which must not be exceeded when the D2D discovery signal is transmitted according to the range class configured to the UE.

The transmit power $P_{PSDCH}$ for the D2D discovery signal transmission may be determined on the basis of maximum output power $P_{CMAX,c}$ at a serving cell c.

The maximum output power $P_{CMAX,c}$ may be determined on the basis of a power value $P_{EMAX,C}$ configured by a network and the power value $P_{EMAX,C}$ configured by the network may be determined by the power information discMaxTxPower for the D2D discovery signal transmission.

In another aspect, provided is a method of transmitting a sidelink synchronization signal (SLSS) and a physical sidelink broadcast channel (PSBCH), performed by a user equipment (UE), in a wireless communication system. The method includes determining transmit power for the SLSS and the PSBCH and transmitting the SLSS and the PSBCH with the determined transmit power. If transmission of the SLSS and the PSBCH is triggered simultaneously for both of device-to-device (D2D) discovery and D2D communication, the transmit power for the SLSS and the PSBCH is determined on the basis of power information P-Max for the D2D communication.

The transmit power for the SLSS and the PSBCH may be determined to a different value in case of being triggered for the D2D discovery and in case of being triggered for the D2D communication.

The power information P-Max for the D2D communication and power information discMaxTxPower for the D2D discovery may be received via different system information blocks (SIBs).

The transmit power for the SLSS and the PSBCH may be determined on the basis of maximum output power $P_{CMAX,c}$ at a serving cell c.

The maximum output power $P_{CMAX,c}$ may be determined on the basis of the maximum power value $P_{EMAX,C}$ configured by a network and the power value $P_{EMAX,C}$ configured by the network may be determined by power information P-Max for the D2D communication.

In still another aspect, provided is a user equipment. The user equipment includes a radio frequency (RF) unit for transmitting and receiving a radio signal and a processor operatively coupled to the RF unit. The processor is configured for receiving power information discMaxTxPower for device-to-device (D2D) discovery signal transmission and determining transmit power $P_{PSDCH}$ for the D2D discovery signal transmission on the basis of the power information discMaxTxPower.

In still another aspect, provided is a user equipment. The user equipment includes a radio frequency (RF) unit for transmitting and receiving a radio signal and a processor operatively coupled to the RF unit. wherein the processor is configured for determining transmit power for a sidelink synchronization signal (SLSS) and a physical sidelink broadcast channel (PSBCH) and transmitting the SLSS and the PSBCH with the determined transmit power. If transmission of the SLSS and the PSBCH is triggered simultaneously for both of device-to-device (D2D) discovery and D2D communication, the transmit power for the SLSS and the PSBCH is determined on the basis of power information P-Max for the D2D communication.

According to the present invention, when transmitting a device-to-device (D2D) discovery signal, a user equipment (UE) can transmit the D2D discovery signal on the basis of power information indicating a maximum transmit power value which can be determined differently depending on a range class configured to the UE. Therefore, unnecessary wastes of power and interference occurrence can be reduced. In addition, when transmitting a synchronization signal and a broadcast channel for a D2D operation, a transmit power value of the synchronization signal and the broadcast channel may vary depending on for which D2D operation it is triggered, for example, whether it is triggered for D2D discovery or triggered for D2D communication. If the synchronization signal and the broadcast channel are triggered for both of the D2D discovery and the D2D communication, which one will be used to determine transmit power is ambiguous, and this is clearly specified in the present invention. Therefore, ambiguity can be removed.

DESCRIPTION OF EXEMPLARY EMBODIMENTS

Figure 1:
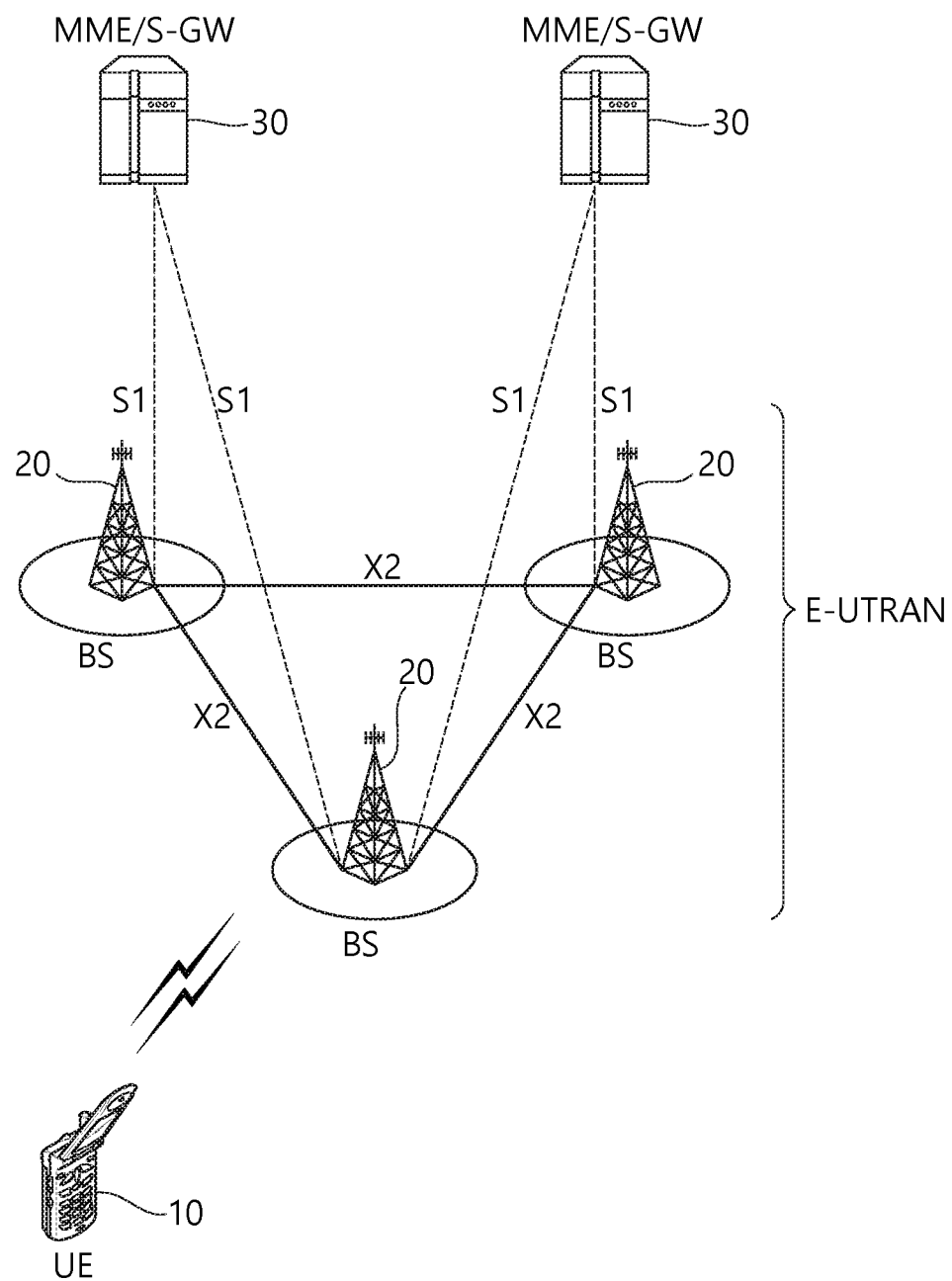
FIG. 1 illustrates a wireless communication system.

FIG. 1 shows a wireless communication system.

The wireless communication system may also be referred to as an evolved-UMTS terrestrial radio access network (E-UTRAN) or a long term evolution (LTE)/LTE-A system. The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
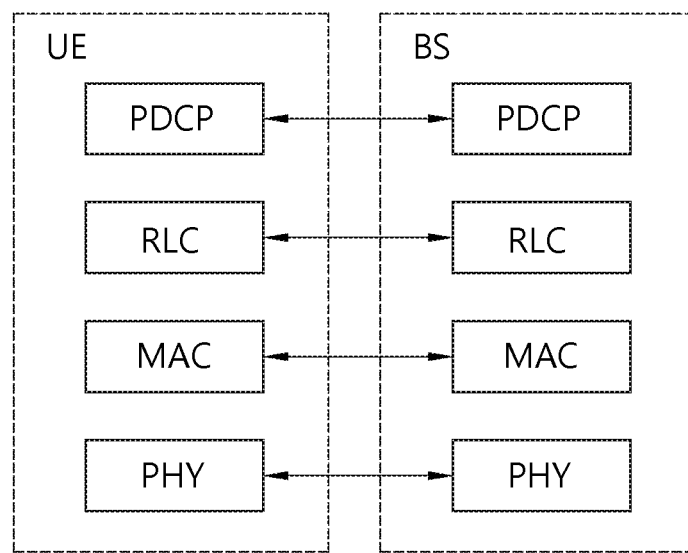
FIG. 2 is a block diagram showing the structure of a radio protocol on the user plane.
Figure 3:
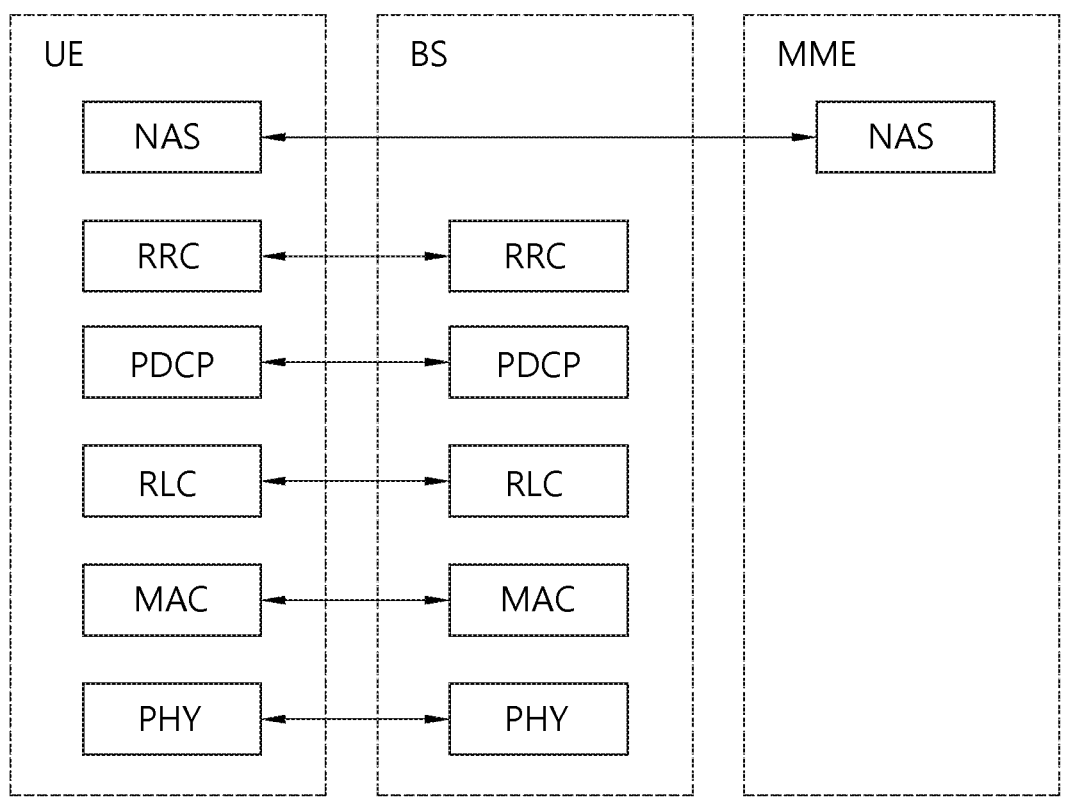
FIG. 3 is a block diagram showing the structure of a radio protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

Now, a device-to-device (D2D) operation is described. In 3GPP LTE-A, a service related to the D2D operation is called a proximity based service (ProSe). Hereinafter, the ProSe is the same concept as the D2D operation, and the ProSe and the D2D operation may be used without distinction. Now, the ProSe is described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

The ProSe direct discovery is a procedure used when the ProSe-enabled UE discovers another proximate ProSe-enabled UE. In this case, only capability of the two ProSe-enabled UEs is used. EPC-level ProSe discovery is a procedure in which an EPC determines whether two ProSe-enabled UEs are in proximity to each other and repots their proximity to the two ProSe-enabled UEs.

Hereinafter, for convenience, the ProSe direct communication may be referred to as D2D communication, and the ProSe direct discovery may be referred to as D2D discovery.

Figure 4:
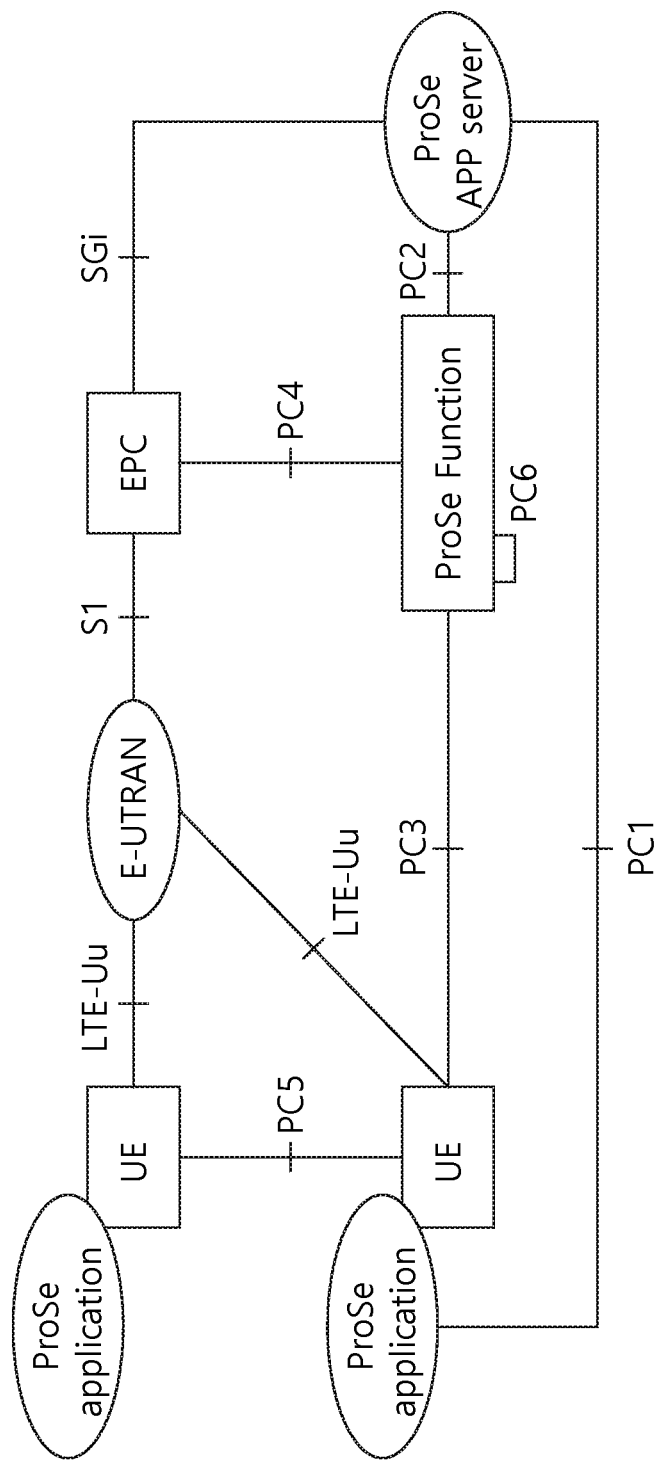
FIG. 4 shows a reference structure for a ProSe.

FIG. 4 shows a reference structure for a ProSe.

Referring to FIG. 4, the reference structure for the ProSe includes an E-UTRAN, an EPC, a plurality of UEs including a ProSe application, a ProSe application (APP) server, and a ProSe function.

The EPC represents an E-UTRAN core network structure. The EPC may include an MME, an S-GW, a P-GW, a policy and charging rules function (PCRF), a home subscriber server (HSS), or the like.

The ProSe APP server is a user having ProSe capability for creating an application function. The ProSe APP server may communicate with an application included in the UE. The application included in the UE may use the ProSe capability for creating the application function.

The ProSe function may include at least one of the following functions, but is not necessarily limited thereto.
 Interworking via a reference point towards the 3rd party applications.
 Authorization and configuration of the UE for discovery and direct communication
 Enable the functionality of the EPC level ProSe discovery
 ProSe related new subscriber data and handling of data storage, and also handling of ProSe identities
 Security related functionality
 Provide control towards the EPC for policy related functionality
 Provide functionality for charging (via or outside of EPC, e.g., offline charging)

Hereinafter, a reference point and a reference interface in the reference structure for the ProSe are described.
 PC1: a reference point between the ProSe application included in the UE and the ProSe-application included in the ProSe APP server. This is used to define a signaling requirement in an application level.
 PC2: a reference point between the ProSe APP server and the ProSe function. This is used to define an interaction between the ProSe APP server and the ProSe function. An application data update of a ProSe database of the ProSe function may be one example of the interaction.
 PC3: a reference point between the UE and the ProSe function. This is used to define an interaction between the UE and the ProSe function. A configuration for ProSe discovery and communication may be one example of the interaction.
 PC4: a reference point between the EPC and the ProSe function. This is used to define an interaction between the EPC and the ProSe function. The interaction may exemplify a case where a path is established for 1:1 communication between UEs or a case where a ProSe service is authenticated for real-time session management or mobility management.
 PC5: a reference point for using a control/user plane for discovery, communication, relay, and 1:1 communication between UEs.

PC6: a reference point for using a function such as ProSe discovery between users belonging to different PLMNs.

SGi: This may be used for application data and application-level control information exchange.

The D2D operation may be supported in both of a case where the UE receives a service inside coverage of a network (cell) or a case where the UE is outside the coverage of the network.

Figure 5:
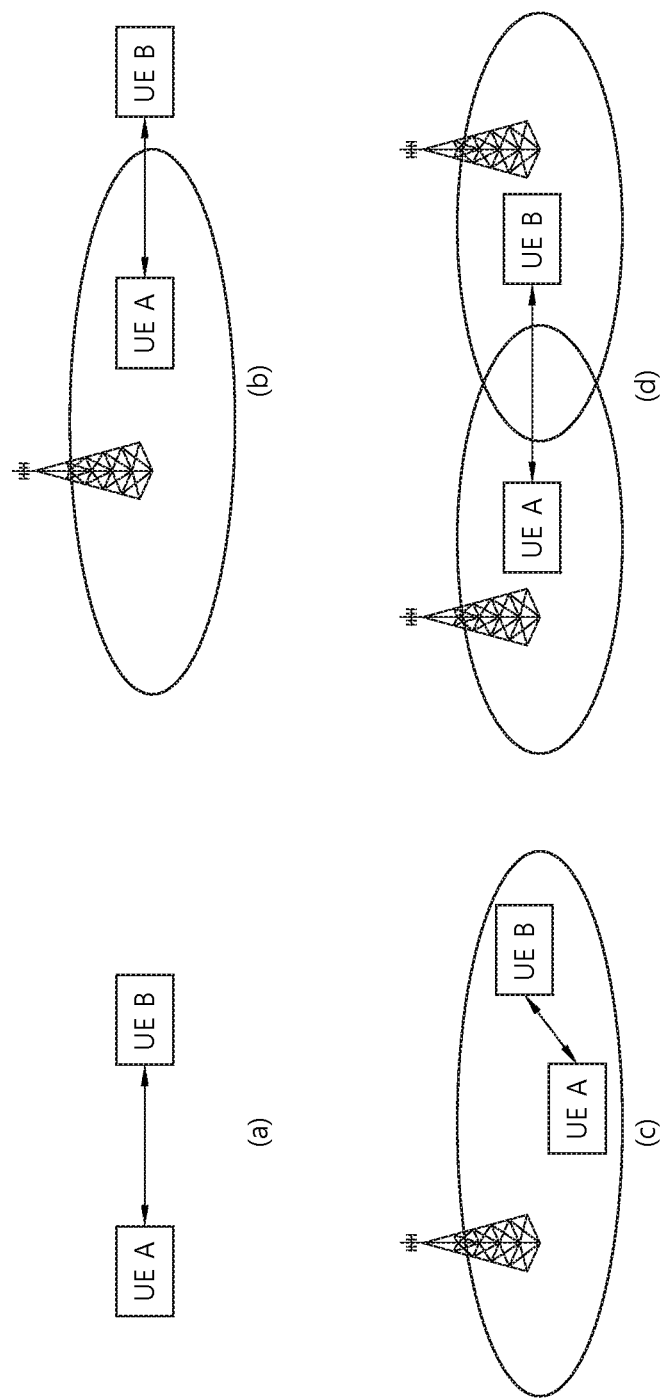
FIG. 5 shows examples of cell coverage deployment with UEs performing a D2D operation.

FIG. 5 shows examples of cell coverage deployment with UEs performing a D2D operation.

Referring to FIG. 5(a), UEs A and B may be both located outside cell coverage. Referring to FIG. 5(b), the UE A may be located inside the cell coverage, and the UE B may be located outside the cell coverage. Referring to FIG. 5(c), the UEs A and B may be both located inside a single cell coverage. Referring to FIG. 5(d), the UE A may be located inside coverage of a 1st cell, and the UE B may be located inside coverage of a 2nd cell.

The D2D operation may be performed between UEs which exist in various locations as shown in FIG. 5.

<Radio resource allocation for D2D communication (ProSe direction communication)>

At least one of the following two modes may be used to allocate resources for the D2D communication.

1. Mode 1

The mode 1 is a mode in which a resource for ProSe direction communication is scheduled from a base station. A UE must be in an RRC_CONNECTED state to transmit data according to the mode 1. The UE requests the base station to transmit a resource, and the base station schedules a resource for scheduling allocation or data transmission. The UE may transmit a scheduling request to the base station, and may transmit a ProSe buffer status report (BSR). On the basis of the ProSe BSR, the base station determines that the UE has data for ProSe direction communication and that a resource for transmitting the data is necessary.

2. Mode 2

The mode 2 is a mode in which a UE directly selects a resource. The UE selects a resource for ProSe direct communication directly from a resource pool. The resource pool may be configured by a network or may be predetermined.

Meanwhile, if the UE has a serving cell, that is, if the UE is in an RRC_CONNECTED state with respect to a base station or is located in a specific cell in an RRC_IDLE state, it is considered that the UE exists inside coverage of the base station.

If the UE exists outside the coverage, only the mode 2 may be applied. If the UE exists inside the coverage, the mode 1 or the mode 2 may be used according to a configuration of the base station.

If there is no other exceptional condition, the UE may change the mode from the mode 1 to the mode 2 or from the mode 2 to the mode 1 only when it is configured by the base station.

<D2D Discovery (ProSe Direct Discovery)>

The D2D discovery is a procedure used when a ProSe-enabled UE discovers another proximate ProSe-enabled UE, and may also be referred to as ProSe direct discovery. Information used in the ProSe direct discovery is hereinafter referred to as discovery information.

The PC5 interface may be used for the D2D discovery. The PC5 interface consists of a MAC layer, a PHY layer, and a ProSe protocol layer which is a higher layer. The higher layer (i.e., ProSe protocol) deals with a grant for announcement and monitoring of the discovery information, and the content of the discovery information is transparent to an access stratum (AS). The ProSe protocol allows only valid discovery information to be delivered to the AS for the announcement. The MAC layer receives the discovery information from the higher layer (i.e., ProSe protocol). An IP layer is not used for discovery information transmission. The MAC layer determines a resource used to announce the discovery information received from the higher layer. The MAC layer creates a MAC protocol data unit (PDU) for carrying the discovery information, and sends it to the PHY layer. A MAC header is not added.

For the discovery information announcement, there are two types of resource allocation.

1. Type 1

As a method in which resources for announcement of discovery information are allocated not in a UE-specific manner, a base station provides a resource pool configuration for the discovery information announcement to UEs. This configuration may be signaled in a broadcast manner by being included in a system information block (SIB). Alternatively, the configuration may be provided by being included in a UE-specific RRC message. Alternatively, the configuration may be broadcast signaling of a different layer or UE-specific signaling, other than the RRC message.

The UE autonomously selects a resource from an indicated resource pool, and announces the discovery information by using the selected resource. The UE may announce the discovery information by using a resource randomly selected during each discovery period.

2. Type 2

This is a method in which resources for announcement of discovery information are allocated in a UE-specific manner. A UE in an RRC_CONNECTED state may request a base station to provide a resource for the discovery signal announcement via an RRC signal. The base station may allocate the resource for the discovery signal announcement via the RRC signal. A resource for discovery signal monitoring may be allocated within a resource pool configured to the UEs.

For a UE in an RRC_IDLE state, 1) the base station may report a type-1 resource pool for the discovery signal announcement via an SIB. When the ProSe direct discovery is allowed, UEs use the ProSe direct discovery for the discovery information announcement in the RRC_IDLE state. Alternatively, 2) the base station may announce that the base station supports the ProSe direct discovery via the SIB but may not provide a resource for the discovery information announcement. In this case, the UE must enter the RRC_CONNECTED state for the discovery information announcement.

For the UE in the RRC_CONNECTED state, the base station may determine whether the UE will use a type-1 resource pool or a type-2 resource pool for the discovery information announcement via the RRC signal.

Figure 6:
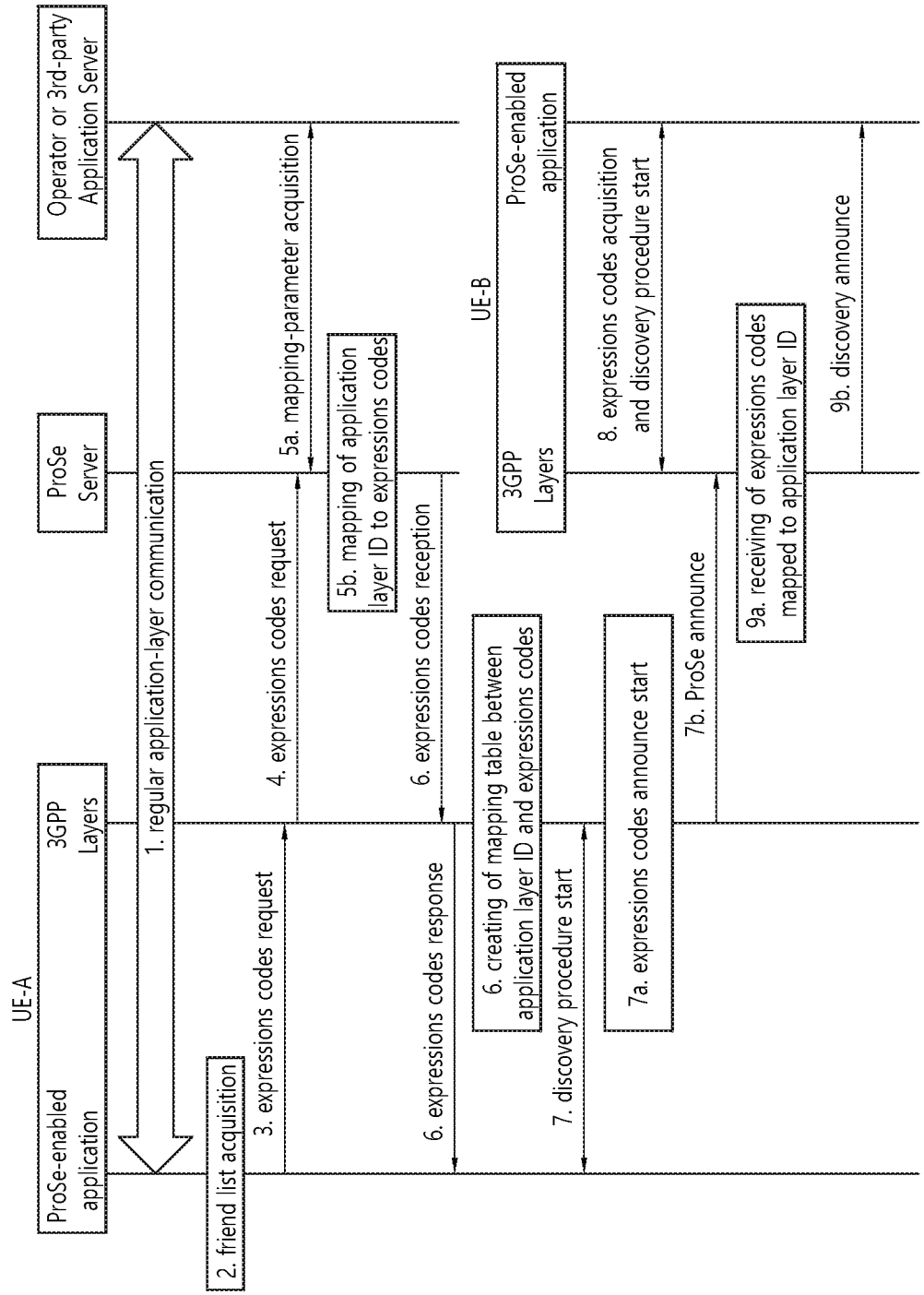
FIG. 6 is an exemplary embodiment of a D2D discovery procedure.

FIG. 6 is an exemplary embodiment of a D2D discovery procedure.

Referring to FIG. 6, it is assumed that a UE A and a UE B operate a ProSe-enabled application, and are configured in the application as a relation of 'friend', that is, a relation capable of allowing D2D communication with each other. Hereinafter, the UE B may be expressed as a 'friend' of the UE A. The application may be, for example, a social networking program. '3GPP layers' correspond to functions of an application for using a ProSe discovery service, specified by 3GPP.

ProSe direct discovery between the UEs A and B may be subjected to the following procedure.

1. First, the UE A performs regular application layer communication with an application server. This communication is based on an application programming interface (API).

2. A ProSe-enabled application of the UE A receives a list of an application layer ID having a relation of 'friend'. The application layer ID may generally have a form of a network access ID. For example, the application layer ID of the UE A may have a form of "adam@example.com".

3. The UE A requests for private expressions codes for a user of the UE A and private expressions codes for a friend of the user.

4. 3GPP layers transmit an expressions codes request to a ProSe server.

5. The ProSe server maps application layer IDs provided from an operator or a third-party application server to the private expressions codes. For example, an application layer ID such as "adam@example.com" may be mapped to private expressions codes such as "GTER543$#2FSJ67DFSF". This mapping may be performed on the basis of parameters (e.g., a mapping algorithm, a key value, etc.) received from an application server of a network.

6. The ProSe server responds to the 3GPP layers with the derived expressions codes. The 3GPP layers announce to a ProSe-enabled application a successful reception of expressions codes for the requested application ID. In addition, a mapping table between the application layer ID and the expressions codes is created.

7. The ProSe-enabled application requests the 3GPP layers to start a discovery procedure. That is, the discovery is attempted when one of the provided 'friends' exists in proximity to the UE A and direct communication is possible. The 3GPP layers announce private expressions codes (i.e., "GTER543$#2FSJ67DFSF" which is private expressions codes of "adam@example.com" in the above example) of the UE A. This is hereinafter referred to as 'announce'. Mapping between the private expressions codes and the application layer ID of the application may be known to and performed by only 'friends' who have received such a mapping relation in advance.

8. It is assumed that the UE B is operating the same ProSe-enabled application as the UE A, and has executed the aforementioned steps 3 to 6. 3GPP layers in the UE B may execute the ProSe discovery.

9. When the UE B receives the aforementioned announce from the UE A, the UE B determines whether private expressions codes included in the announce are known to the UE B or are mapped to an application layer ID. As described in step 8, since steps 3 to 6 have already been executed, the UE B also knows private expressions codes for the UE A, mapping between the private expressions codes and the application layer ID, and a corresponding application. Therefore, the UE B may discover the UE A from the announce of the UE A. 3GPP layers in the UE B announce to a ProSe-enabled application that "adam@example.com" is discovered.

In FIG. 6, the discovery procedure is described by considering all of the UEs A and B, the ProSe server, the application server, etc. From an aspect of an operation between the UEs A and B, the UE A transmits a signal called an announce (this process may be referred to as an announcement), and the UE B discovers the UE A by receiving the announce. That is, from an aspect that an operation directly related to another UE among operations performed by each UE is only one step, the discovery procedure of FIG. 6 may be referred to as a single-step discovery procedure.

Figure 7:
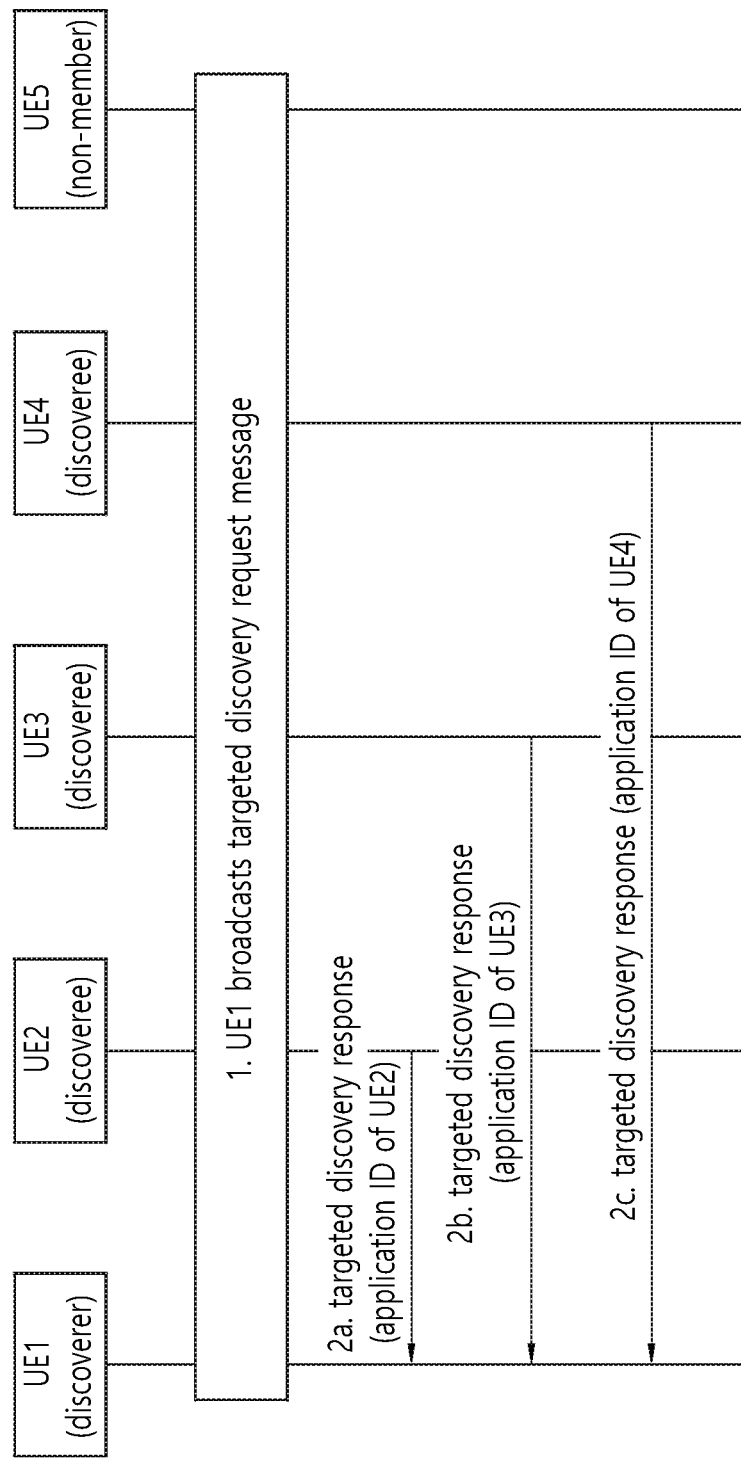
FIG. 7 shows another embodiment of a D2D discovery procedure.

FIG. 7 shows another embodiment of a D2D discovery procedure.

In FIG. 7, it is assumed that UEs 1 to 4 are UEs included in a specific group communication system enablers (GCSE) group. It is assumed that the UE 1 is a discoverer, and the UEs 2, 3, and 4 are discoverees. A UE 5 is a UE irrelevant to the discovery procedure.

The UE 1 and the UEs 2 to 4 may perform the following operation in the discovery procedure.

First, the UE 1 broadcasts a targeted discovery request message (hereinafter, also simply referred to as a discovery request message or M1) to discover whether any UE included in the GCSE group exists in proximity. The targeted discovery request message may include a unique application group ID or layer-2 group ID of the specific GCSE group. Further, the targeted discovery request message may include a unique ID of the UE 1, i.e., an application private ID. The targeted discovery request message may be received by the UEs 2, 3, 4, and 5.

The UE 5 does not transmit any response message. On the other hand, the UEs 2, 3, and 4 included in the GCSE group transmit a targeted discovery response message (hereinafter, also simply referred to as a discovery response message or M2) in response to the targeted discovery request message. The targeted discovery response message may include a unique application private ID of a UE which transmits this message.

In an operation performed between UEs in the ProSe discovery procedure described in FIG. 7, a discoverer (i.e., the UE 1) transmits a targeted discovery request message, and receives a targeted discovery response message in response thereto. Further, upon receiving a targeted discovery request message, a discoveree (e.g., the UE 2) also transmits a targeted discovery response message in response thereto. Therefore, each UE performs an operations of two steps. In this aspect, the ProSe discovery procedure of FIG. 7 may be referred to as a 2-step discovery procedure.

In addition to the discovery procedure described in FIG. 7, if the UE 1 (i.e., discoverer) transmits a discovery confirm message (hereinafter, also simply referred to as M3) in response to a targeted discovery response message, this may be referred to as a 3-step discovery procedure.

Meanwhile, a UE supporting a D2D operation may provide relay functionality to another network node (e.g., another UE or base station).

Figure 8:
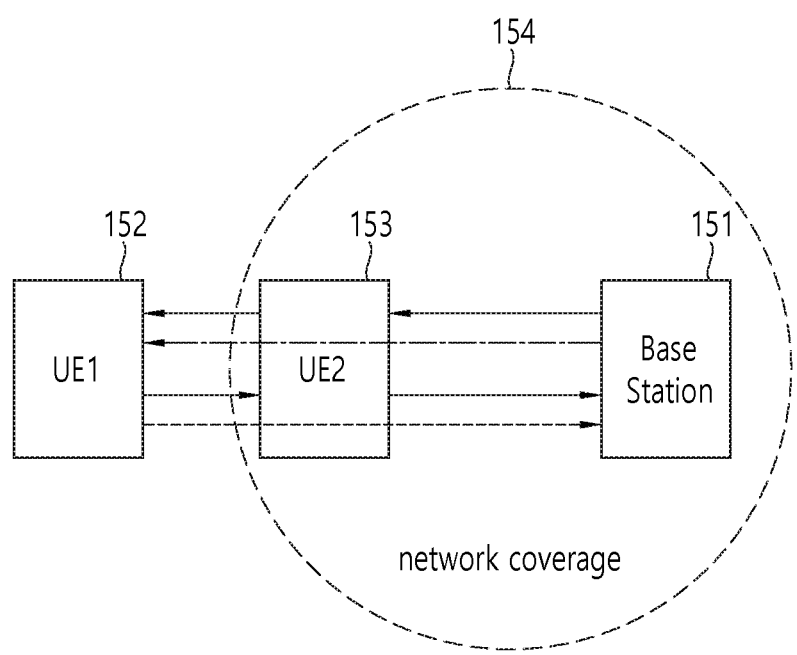
FIG. 8 shows an example of a UE for providing relay functionality.

FIG. 8 shows an example of a UE for providing relay functionality.

Referring to FIG. 8, a UE2 153 plays a role of a relay between a base station 151 and a UE1 152. That is, the UE2 153 may be a network node which plays a role of a relay between the network 151 and the UE1 152 located outside a network coverage 154. A D2D operation may be performed between the UE1 152 and the UE2 153, and the conventional cellular communication (or wide area network (WAN) communication) may be performed between the UE2 153 and the network 151. In FIG. 8, since the UE1 152 is located outside the network coverage, communication with the network 151 cannot be performed if the UE2 153 does not provide the relay functionality.

Now, the present invention is described.

The present invention proposes a method of effectively determining transmit power when a UE for performing a D2D operation (hereinafter, such a UE may be called a "D2D UE") transmits a D2D signal. Herein, the D2D operation may include D2D discovery and D2D communication. This has been described above. The D2D communication implies communication performed by a UE to directly exchange data with other UEs by using a wireless channel. Hereinafter, the D2D discovery may be simply referred to as discovery. In general, the UE implies a UE used by a user. However, when network equipment such as a base station transmits/receives a signal according to a communication scheme between UEs, the network equipment may also be considered as a type of the UE.

First, acronyms used in the present specification are described.

(1) PSBCH (Physical Sidelink Broadcast CHannel): physical sidelink broadcast channel.

(2) PSCCH (Physical Sidelink Control CHannel): physical sidelink control channel.

(3) PSDCH (Physical Sidelink Discovery CHannel): physical sidelink discovery channel.

(4) PSSCH (Physical Sidelink Shared CHannel): physical sidelink shared channel.

(5) SSS (Sidelink Synchronization Signal): sidelink synchronization signal. SSS may also be expressed as SLSS. The SSS may include PSSS and SSSS. A.PSSS (Primary Sidelink Synchronization Signal): primary sidelink synchronization signal, B.

SSSS (Secondary Sidelink Synchronization Signal): secondary sidelink synchronization signal.

Hereinafter, for convenience of explanation, a proposed method is described on the basis of a 3GPP LTE/LTE-A system. However, a scope of systems to which the proposed method is applied can also be extended to other systems in addition to the 3GPP LTE/LTE-A system.

A UE may calculate transmit power as follows in association with PSSCH/PSCCH/PSDCH/PSSS/SSSS in a subframe in which a D2D operation is performed.

1) PSSCH power control

In case of a sidelink transmission mode 1 and a PSCCH period i, if a TPC field of a sidelink grant for the PSCCH period i is set to 0, it is given as $P_{PSSCH}=P_{CMAX,PSSCH}$. If the TPC field for the sidelink grant for the PSCCH period i is set to 1, $P_{PSSCH}$ is given by the following equation.

$$P_{PSSCH}=\min\{P_{CMAX,PSSCH}, 10\log_{10}(M_{PSSCH})+P_{O\_SSCH,1}+\alpha_{SSCH,1}\cdot PL\} \text{ [dBm]} \quad \text{[Equation 1]}$$

In the above equation, $P_{CMAX,PSSCH}$ is a value of $P_{CMAX,c}$ determined by the UE as to an uplink subframe corresponding to a sidelink subframe in which a PSSCH is transmitted. $M_{PSSCH}$ is a band of a PSSCH resource allocation expressed by the number of resource blocks. PL denotes a path loss value. $P_{O\_PSSCH,1}$ and $\alpha_{PSSCH,1}$ are values provided by higher layer parameters.

For a sidelink transmission mode 2, $P_{PSSCH}$ is given by the following equation.

$$P_{PSSCH}=\min\{P_{CMAX,PSSCH}, 10\log(M_{PSSCH})+P_{O\_PSSCH,2}+\alpha_{PSSCH,2}\cdot PL\} \text{ [dBm]} \quad \text{[Equation 2]}$$

In the above equation, $P_{CMAX,PSSCH}$ is a value of $P_{CMAX,c}$ determined by the UE as to an uplink subframe corresponding to a sidelink subframe in which a PSSCH is transmitted. $M_{PSSCH}$ is a band of a PSSCH resource allocation expressed by the number of resource blocks. PL denotes a path loss value. $P_{O\_PSSCH,2}$ and $\alpha_{PSSCH,2}$ are values provided by higher layer parameters.

2) PSCCH Power Control

In case of a sidelink transmission mode 1 and a PSCCH period i, if a TPC field of a sidelink grant for the PSCCH period i is set to 0, it is given as $P_{PSCCH}=P_{CMAX,PSCCH}$. If the TPC field for the sidelink grant for the PSCCH period i is set to 1, $P_{PSCCH}$ is given by the following equation.

$$P_{PSCCH}=\min\{P_{CMAX,PSCCH}, 10\log_{10}(M_{PSCCH})+P_{O\_PSCCH,1}+\alpha_{PSCCH,1}\cdot PL\} \text{ [dBm]} \quad \text{[Equation 3]}$$

In the above equation, $P_{CMAX,PSCCH}$ is a value of $P_{CMAX,c}$ determined by the UE as to an uplink subframe corresponding to a sidelink subframe in which a PSCCH is transmitted. $M_{PSCCH}$ is 1, and PL denotes a path loss value. $P_{O\_PSCCH,1}$ and $\alpha_{PSCCH,1}$ are values provided by higher layer parameters.

For a sidelink transmission mode 2, $P_{PSCCH}$ is given by the following equation.

$$P_{PSCCH}=\min\{P_{CMAX,PSCCH}, 10\log_{10}(M_{PSCCH})+P_{O\_PSCCH,2}+\alpha_{PSCCH,2}\cdot PL\} \text{ [dBm]} \quad \text{[Equation 4]}$$

In the above equation, $P_{CMAX,PSCCH}$ is a value of $P_{CMAX,c}$ determined by a higher layer (or determined by the UE as to an uplink subframe corresponding to a sidelink subframe in which a PSCCH is transmitted). $M_{PSCCH}$ is 1, and PL denotes a path loss value. $P_{O\_PSCCH,2}$ and $\alpha_{PSCCH,2}$ are values provided by higher layer parameters.

3) PSDCH Power Control

For a sidelink discovery, $P_{PSDCH}$ is given by the following equation.

$$P_{PSDCH}=\min\{P_{CMAX,PSDCH}, 10\log_{10}(M_{PSDCH})+P_{O\_PSDCH,1}+\alpha_{PSDCH,1}\cdot PL\} \text{ [dBm]} \quad \text{[Equation 5]}$$

In the above equation, $P_{CMAX,PSDCH}$ is a value of $P_{CMAX,c}$ determined by the UE as to an uplink subframe corresponding to a sidelink subframe in which a PSDCH is transmitted. $M_{PSDCH}$ is 2, and PL denotes a path loss value. $P_{O\_PSDCH,1}$ and $\alpha_{PSDCH,1}$ are values provided by higher layer parameters.

4) Sidelink Synchronization Signal (SSS) Power Control

In a sidelink, if transmit power used to transmit a primary synchronization signal (PSSS) and a secondary synchronization signal (SSSS) is denoted by $P_{PSSS}$, it is given as $P_{PSSS}=P_{CMAX,PSSS}$ when a sidelink transmission mode 1 is set to a UE, a sidelink synchronization signal is transmitted in a PSCCH period i, and a TPC field of a sidelink grant for the PSCCH period i is set to 0. Otherwise, $P_{PSSS}$ is given by the following equation.

$$P_{PSSS}=\min\{P_{CMAX,PSSS}, 10\log_{10}(M_{PSSS})+P_{O\_PSSS}+\alpha_{PSSS}\cdot PL\} \text{ [dBm]} \quad \text{[Equation 6]}$$

In the above equation, $P_{CMAX,PSSS}$ is a value of $P_{CMAX,c}$ determined by the UE as to an uplink subframe corresponding to a sidelink subframe in which a sidelink synchronization signal (SSS) is transmitted. $P_{O\_PSSS}$ and $\alpha_{PSSS}$ are values provided by higher layer parameters, and are related to a corresponding SSS resource configuration.

Meanwhile, values $P_{CMAX}$ and $P_{CMAX,c}$ used to determine uplink signal transmit power in an uplink subframe of a WAN (i.e., an uplink subframe used in uplink transmission of a WAN such as LTE/LTE-A) may be defined or calculated as follows.

The UE is allowed to autonomously configure $P_{CMAX,c}$ in a specific range as maximum output power configured for a serving cell. $P_{CMAX,c}$ may be configured within a specific range as shown in the following equation.

$$P_{CMAX\_L,c} \leq P_{CMAX,c} \leq P_{CMAX\_H,c} \quad \text{[Equation 7]}$$

In the above equation, $P_{CMAX,L,c}$ and $P_{CMAX,H,c}$ are given by the following equation.

$$P_{CMAX\_L,c}=\text{MIN }\{P_{EMAX,c}-\Box T_{C,c}, P_{PowerClass}-\text{MAX}(MPR_c+A\text{-}MPR_c+\Delta T_{IB,c}+\Box T_{C,c}, P\text{-}MPR_c)\}$$

$$P_{CMAX\_H,c}=\text{MIN }\{P_{EMAX,c}, P_{PowerClass}\} \quad \text{[Equation 8]}$$

In the above equation, $P_{EMAX,c}$ is a value provided by IE P-Max as an information element (IE) for a serving cell c. The IE P-Max may be included in an RRC message. $P_{PowerClass}$ is maximum UE power in which a tolerance is not considered. $MPR_c$ denotes a maximum power reduction value for the serving cell c, and $A\text{-}MPR_c$ denotes an additional maximum power reduction value for the serving cell c. $T_{IB,c}$ denotes an additional tolerance for the serving cell c. $T_{C,c}$ is 1.5 dB or 0 dB. $P\text{-}MPR_c$ is an allowed maximum output power reduction. MIN {A, B} denotes a smaller value between A and B.

For each subframe, $P_{CMAX,L,c}$ for the serving cell c is calculated for each slot, and a minimum value among values $P_{CMAX,L,c}$ calculated in each of two slots in the subframe is applied to the entirety of the subframe. The UE does not exceed $P_{PowerClass}$ in any time period.

Meanwhile, if the measured 'configured maximum output power' is $P_{UMAX,c}$, $P_{UMAX,c}$ is in the following range.

$$P_{CMAX\_L,c} - MAX\{T_L, T(P_{CMAX\_L,c})\} \le P_{UMAX,c} \le P_{CMAX\_H,c} + T(P_{CMAX\_H,c})$$ [Equation 9]

In the above equation, MAX {A, B} denotes a greater value between A and B, and $T(P_{CMAX,c})$ may be defined by the following table.

TABLE 1

| $P_{CMAX,c}$ (dBm) | Tolerance $T(P_{CMAX,\,c})$ (dB) |
|---|---|
| 23 < $P_{CMAX,\,c}$ ≤ 33 | 2.0 |
| 21 ≤ $P_{CMAX,\,c}$ ≤ 23 | 2.0 |
| 20 ≤ $P_{CMAX,\,c}$ < 21 | 2.5 |
| 19 ≤ $P_{CMAX,\,c}$ < 20 | 3.5 |
| 18 ≤ $P_{CMAX,\,c}$ < 19 | 4.0 |
| 13 ≤ $P_{CMAX,\,c}$ < 18 | 5.0 |
| 8 ≤ $P_{CMAX,\,c}$ < 13 | 6.0 |
| −40 ≤ $P_{CMAX,\,c}$ < 8 | 7.0 |

According to a modulation and a channel bandwidth, a maximum power reduction (MPR) allowed for maximum output power may be defined by the following table.

TABLE 2

| Modulation | Channel bandwidth/Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The network announces a requirement to be additionally satisfied in a specific deployment scenario to the UE by signaling an additional adjacent channel leakage power ratio (ACLR) and a spectrum emission requirement. The ACLR denotes a ratio of average power filtered at a center of an allocated channel frequency and average power filtered at a center of an adjacent channel frequency. To satisfy such an additional requirement, an additional maximum power reduction (A-MPR) may be allowed.

In an uplink carrier aggregation which aggregates and uses a plurality of carriers in an uplink, the UE is allowed to configure $P_{CMAX,c}$ which is maximum output power for the serving cell c included in the plurality of carriers and $P_{CMAX}$ which is maximum output power for all of the plurality of carriers.

In an inter-band uplink carrier aggregation, $P_{CMAX}$ may be determined within a specific range as shown in the following equation.

$$P_{CMAX\_L} \le P_{CMAX} \le P_{CMAX\_H}$$ [Equation 10]

In the above equation, $P_{CMAX\_L}$ and $P_{CMAX\_H}$ may be determined by the following equation.

$$P_{CMAX\_L} = MIN\{10\log_{10}\Sigma\ MIN[p_{EMAX,c}/(\Box t_{C,c}),$$
$$p_{PowerClass}/(mpr_c \cdot a\text{-}mpr_c \cdot \Box t_{C,c} \cdot \Box t_{IB,c}),$$
$$p_{PowerClass}/pmpr_c], P_{PowerClass}\}$$

$$P_{CMAX\_H} = MIN\{10\log_{10}\Sigma p_{EMAX,c}, P_{PowerClass}\}$$ [Equation 11]

In the above equation, $p_{EMAX,c}$ is a linear value of $P_{EMAX,c}$ given by IE P-Max for the serving cell c. $P_{PowerClass}$ is maximum UE power in which a tolerance is not considered, and $p_{PowerClass}$ is a linear value of $P_{PowerClass}$. $mpr_c$ and $a\text{-}mpr_c$ are linear values of $MPR_c$ and $A\text{-}MPR_c$. $pmpr_c$ is a linear value of $P\text{-}MPR_c$. $\Box t_{C,c}$ is a linear value of $\Box T_{C,c}$, and is 1.41 or 0. $\Box t_{IB,c}$ is a linear value of $\Box T_{IB,c}$.

Meanwhile, in an intra-band uplink carrier aggregation, $P_{CMAX\_L}$ and $P_{CMAX\_H}$ may be determined as shown in the following equation.

$$P_{CMAX\_L} = MIN\{10\log_{10}\Sigma p_{EMAX,c} - \Box T_C, P_{PowerClass} - MAX(MPR + A\text{-}MPR + \Delta T_{IB,c} + \Delta T_C, P\text{-}MPR)\}$$

$$P_{CMAX\_H} = MIN\{10\log_{10}\Sigma p_{EMAX,c}, P_{PowerClass}\}$$ [Equation 12]

In the above equation, $p_{EMAX,c}$ is a linear value of $P_{EMAX,c}$ given by IE P-Max for the serving cell c. $P_{PowerClass}$ is maximum UE power in which a tolerance is not considered. MPR denotes a maximum power reduction value, and A-MPR denotes an additional maximum power reduction value. $T_{IB,c}$ denotes an additional tolerance for the serving cell c. $\Delta T_C$ is a highest value among values $\Delta T_{C,c}$, and $\Delta T_{C,c}$ is 1.5 dB is 0 dB. P-MPR is a power management term for the UE.

For each subframe, $P_{CMAX,L}$ is calculated per slot, and a minimum value among values $P_{CMAX,L}$ calculated in each of two slots in the subframe is applied to the entirety of the subframe. The UE does not exceed $P_{PowerClass}$ in any time period.

If a plurality of timing advance groups (TAGs) is configured to the UE, and if a first symbol of transmission for another serving cell belonging to another TAG partially overlaps in a subframe i+1 when the UE performs transmission for any serving cell belonging to one TAG in a subframe i, the UE may apply a maximum value of $P_{CMAX\_L}$ for the subframes i and i+1 to the overlapped part. The UE does not exceed $P_{PowerClass}$ in any time period.

For an intra-band contiguous carrier aggregation, an MPR may be given as follows.

TABLE 3

| | CA bandwidth Class C | | | | | |
|---|---|---|---|---|---|---|
| Modulation | 25 RB + 100 RB | 50 RB + 100 RB | 75 RB + 75 RB | 75 RB + 100 RB | 100 RB + 100 RB | MPR (dB) |
| QPSK | >8 and ≤25 | >12 and ≤50 | >16 and ≤75 | >16 and ≤75 | >18 and ≤100 | ≤1 |
| QPSK | >25 | >50 | >75 | >75 | >100 | ≤2 |
| 16 QAM | ≤8 | ≤12 | ≤16 | ≤16 | ≤18 | ≤1 |
| 16 QAM | >8 and ≤25 | >12 and ≤50 | >16 and ≤75 | >16 and ≤75 | >18 and ≤100 | ≤2 |
| 16 QAM | >25 | >50 | >75 | >75 | >100 | ≤3 |

It is described an example of determining transmit power in a dual connectivity state which indicates a state where the UE is connected to two different cells.

It is assumed that maximum output power for the serving cell of a cell group i(i=1,2) is denoted by $P_{CMAX,c,i}$. In this case, $P_{CMAX,c,i}$ may be configured in the following range.

$$P_{CMAX\_L,c,i} \leq P_{CMAX,c,i} \leq P_{CMAX\_H,c,i} \qquad \text{[Equation 13]}$$

Meanwhile, total maximum output power $P_{CMAX}$ of the UE is determined as following $$P_{CMAX\_L} \leq P_{CMAX} \leq P_{CMAX\_H} \qquad \text{[Equation 14]}$$

If a dual connectivity is configured to the UE, subframes for one cell group may overlap with subframes for another cell group.

If simultaneous transmission occurs between uplink serving cells of the cell groups, $P_{CMAX\_L}$ and $P_{CMAX\_H}$ are determined similarly to an inter-band carrier aggregation.

If the dual connectivity is configured to the UE and if transmission in a subframe p for a 1$^{st}$ serving cell of a 1$^{st}$ cell group partially overlaps with transmission in a subframe q+1 for a 2$^{nd}$ serving cell of a 2$^{nd}$ cell group (it may overlap in a part of a 1$^{st}$ symbol of the subframe q+1), the UE may apply a smallest $P_{CMAX\_L}$ to the overlapped part between subframe pairs (p,q) and (p+1,q+1). The UE does not exceed $P_{PowerClass}$ in any time period.

Methods described hereinafter can be used to determine/allocate transmit power related to D2D signal transmission in a subframe for transmitting a D2D signal (hereinafter, also expressed as a D2D subframe (SF)). In the following methods, D2D signal transmit power must be constant in one D2D SF, and may be interpreted as not having an effect on determining of transmit power of a WAN uplink signal transmitted at the same time or a partially overlapping time on different carriers. That is, it may be interpreted that a WAN uplink signal has a higher priority than a D2D signal in terms of power allocation.

A D2D signal transmitted at a specific time may determine transmit power on the basis of the following rule. Hereinafter, for convenience of explanation, the following cases are assumed.

'CASE (1)' shows a case where a time synchronization related to a D2D signal transmission subframe (this may be referred to as a "D2D TX SF") on a Cell # A is identical to a time synchronization related to a subframe for transmitting a WAN uplink signal (this may be referred to as a "WAN UL TX SF") on a Cell # B.

'CASE (2)' shows a case where a time synchronization related to a D2D TX SF on a Cell # A is different from a time synchronization related to a WAN UL TX SF on a Cell # B. A difference level may be within a pre-defined or signaled threshold. Further, for example, since the Cell # A and the Cell # B belong to different timing advance groups (TAGs) in 'CASE (2)', it may be interpreted as a case where an SF # Q which is the D2D TX SF of the Cell # A partially overlaps with an SF #(P+1) which is the WAN UL TX SF of the Cell # B.

Figure 9:
FIG. 9 exemplifies the aforementioned 'CASE (1)' and 'Case (2)'.
Figure 9:
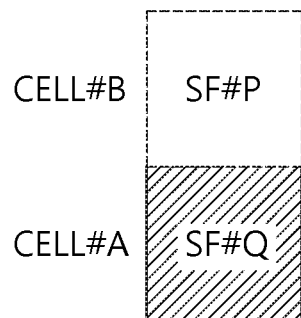
Figure 9:
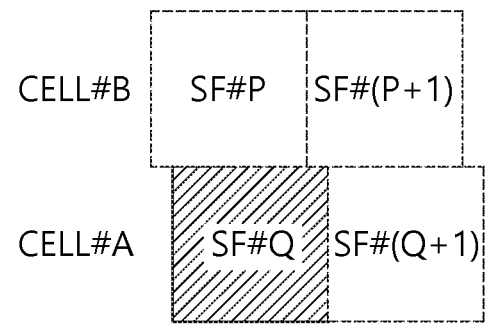

FIG. 9 exemplifies the aforementioned 'CASE (1)' and 'Case (2)'.

Referring to the sub-figure (a) of FIG. 9, an SF # Q of a Cell # A and an SF # P of a Cell # B are aligned temporally. That is, timing synchronization is achieved in the SF # Q of the Cell # A and the SF # P of the Cell # B.

Referring to the sub-figure (b) of FIG. 9, an SF # Q of a Cell # A and an SF # P of a Cell # B are not aligned temporally. Unlike the sub-figure (a) of FIG. 9, the SF # Q of the Cell # A partially overlaps with an SF # P+1 of the Cell # B.

The proposed methods of the present invention are also applicable extensively to other cases, for example, a case where the SF # Q which is the D2D TX SF on the Cell # A (or a D2D cell/carrier) leads the SF # P which is the WAN TX SF on the Cell # B (or a WAN UL cell(carrier)) on a time domain, and/or a case where the SF # P which is the WAN UL TX SF on the Cell # B (or a WAN UL cell/carrier) leads the SF # Q which is the D2D TX SF on the Cell # A (or a D2D cell(carrier)) on the time domain.

Hereinafter, for convenience of explanation, an SF index 'Q (/(Q+1))' of the Cell # A may be assumed as 'K (or (K+1)) (/(K+1))', and an SF index 'P (/(P+1))' of the Cell # B may be assumed as 'K (or (K+1)) (/(K+1))'.

Further, the proposed methods of the present invention may be limitedly applied only when a discovery signal is transmitted in practice and/or when a signal is transmitted through D2D communication.

[Proposed method #1] When an operation of transmitting a discovery signal is performed by a UE which intends to perform a D2D operation in an SF # N of a Cell # C, a value $P_{CMAX,C}(N)$ (and/or $P_{CMAX}(N)$) to be used when determining discovery signal TX power may be calculated by substituting a maximum (discovery) TX power value indicated by 'discMaxTxPower-r12' related to the Cell # C to a parameter $P_{EMAX,C}$.

Herein, the 'discMaxTxPower-r12' is a parameter used to calculate maximum TX power when a UE configured as a specific range class transmits a discovery signal (ProSe direct discovery), and may indicate maximum TX power which must not be exceeded by the UE configured as the specific range class when the discovery signal is transmitted inside coverage of a corresponding cell.

Figure 10:
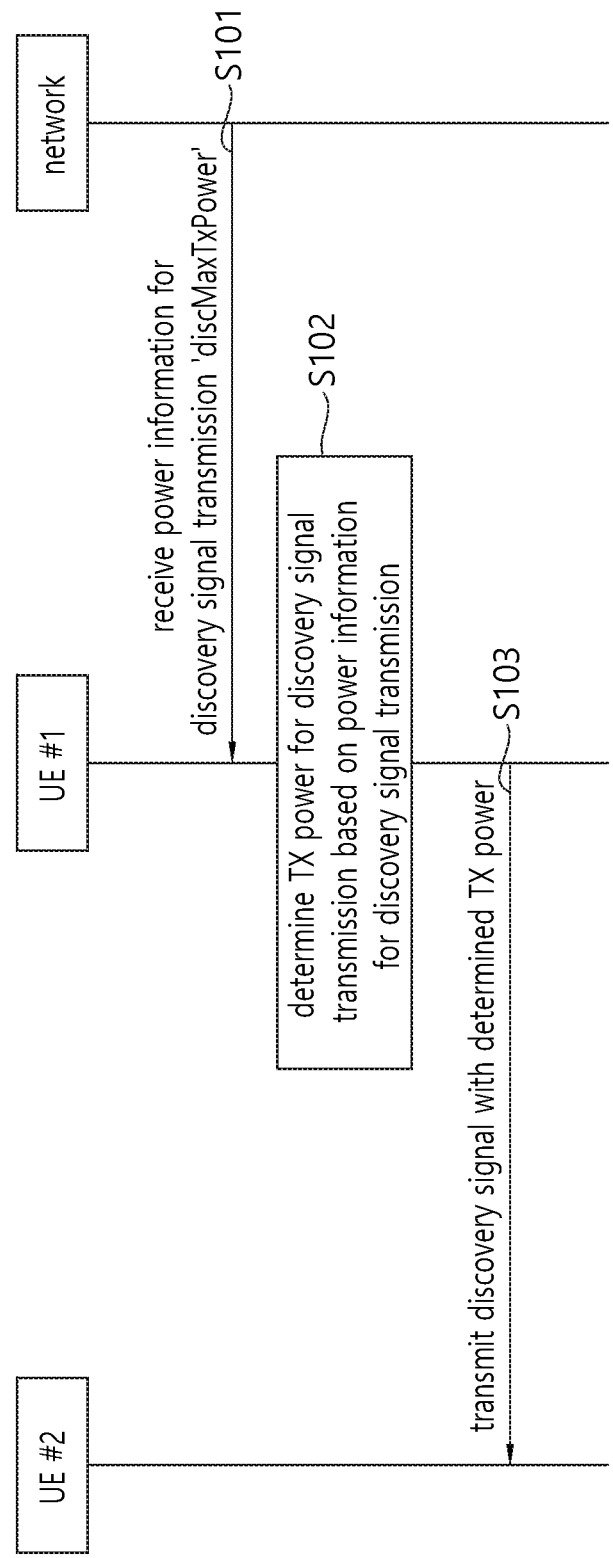
FIG. 10 shows a discovery signal transmission method of a UE according to an embodiment of the present invention.

FIG. 10 shows a discovery signal transmission method of a UE according to an embodiment of the present invention.

Referring to FIG. 10, a UE #1 receives power information 'discMaxTxPower' for discovery signal transmission from a network (S101). The network may be, for example, a serving cell of the UE #1, and the UE #1 may exist inside coverage of the serving cell. The power information discMaxTxPower may be received via not a system information block for receiving power information for D2D communication but via other system information blocks. For example, power information P-Max for D2D communication may be received via an SIB 1, and the power information discMaxTxPower may be received via other system information blocks.

The following table is an example of the power information discMaxTxPower for discovery signal transmission.

TABLE 4

```
-- ASN1START
SL-DiscTxPowerInfoList-r12 ::=  SEQUENCE (SIZE
                                (maxSL-DiscPowerClass-r12))
OF SL-DiscTxPowerInfo-r12
SL-DiscTxPowerInfo-r12 ::=             SEQUENCE {
    discMaxTxPower-r12                    P-Max,
    ...
}
-- ASN1STOP
```

In the above table, discMaxTxPower-r12 may be provided plural in number, and in this case, first one may relate to a UE having a short range class, second one may relate to a UE having a medium range class, and third one may relate to a UE having a long range class. A range class is configured to the UE, and the range class may indicate any one of short, medium, and long. In this case, the power information discMaxTxPower may indicate maximum transmit power which must not be exceeded when the D2D discovery signal is transmitted according to the range class configured to the UE.

The UE #1 determines TX power for the discovery signal transmission on the basis of the power information for the discovery signal transmission (S102).

For example, maximum output power $P_{CMAX,c}$ for discovery signal transmission at a serving cell c may be determined as shown in the following equation.

$$P_{CMAX\_L,c} \le P_{CMAX,c} \le P_{CMAX\_H,c} \quad \text{[Equation 15]}$$

In the above equation, $P_{CMAX,L,c}$ and $P_{CMAX,H,c}$ are given by the following equation.

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c} + \Delta T_{C,c} + \Delta T_{ProSe}, P\text{-}MPR_c)\} \quad \text{[Equation 16]}$$

$$P_{CMAX\_H,c} = \text{MIN}\{P_{EMAX,c}, P_{PowerClass}\} \quad \text{[Equation 16]}$$

In the above equation, $P_{EMAX,c}$ is not IE P-Max as an information element (IE) for a serving cell c but a value provided by the aforementioned power information 'discMaxTxPower' for discovery signal transmission. The 'discMaxTxPower' may be provided via an RRC signal. $P_{PowerClass}$ is maximum UE power in which a tolerance is not considered. $MPR_c$ denotes a maximum power reduction value for the serving cell c, and A-$MPR_c$ denotes an additional maximum power reduction value for the serving cell c. $\Delta T_{IB,c}$ denotes an additional tolerance for the serving cell. $\Delta T_{C,c}$ is 1.5 dB or 0 dB. $\Delta T_{ProSe}$ may be 0.1 dB. P-$MPR_c$ is an allowed maximum output power reduction.

On the basis of the maximum output power $P_{CMAX,c}$ determined by Equation 16, the transmit power $P_{PSDCH}$ used in the discovery signal transmission may be determined by the following equation.

$$P_{PSDCH} = \min\{P_{CMAX,PSDCH}, 10 \log_{10}(M_{PSDCH}) P_{O\_PSDCH,1} + \alpha_{PSDCH,1} \cdot PL\} \text{ [dBm]} \quad \text{[Equation 17]}$$

In the above equation, $P_{CMAX,PSDCH}$ is a value of $P_{CMAX,c}$ determined by the UE as to an uplink subframe corresponding to a sidelink subframe in which a PSDCH is transmitted. In this case, the value $P_{CMAX,c}$ may be determined by the above equations 15 and 16. $M_{PSDCH}$ is 2, and PL denotes a path loss value. $P_{O\_PSDCH,1}$ and $\alpha_{PSDCH,1}$ are values provided by higher layer parameters.

The UE #1 transmits a discovery signal with the determined TX power $P_{PSDCH}$ (S103). For example, if a UE #2 is in proximity to the UE #1, it may receive the discovery signal transmitted by the UE #1.

According to the aforementioned method, a serving cell may differently configure TX power to be used by the UE #1 to transmit the discovery signal and TX power to be used to perform uplink transmission to the serving cell. This is because $P_{EMAX,c}$ can be announced by using 'discMaxTxPower' instead of the existing IE P-Max. Therefore, interference inside cell coverage can be regulated by adjusting TX power of a UE which transmits a discovery signal inside the cell coverage. Further, since TX power for discovery signal transmission can be determined by considering a range class of the UE, an unnecessary power waste can also be avoided.

Alternatively, when an operation of transmitting a discovery signal is performed by a UE which intends to perform a D2D operation in an SF # N of a Cell # C, a value $P_{CMAX,C}(N)$ (and/or $P_{CMAX}(N)$) to be used when determining discovery signal TX power may be calculated by substituting a maximum (discovery) TX power value corresponding to a parameter P-Max of the Cell # C related to WAN UL communication, received via a pre-defined signal (e.g., SIB 1) to a parameter $P_{EMAX,C}$.

That is, TX power $P_{PSDCH}$ for D2D discovery signal transmission may be determined on the basis of maximum output power $P_{CMAX,c}$ at a serving cell c or $P_{CMAX}$. In this case, the maximum output power $P_{CMAX,c}$ at the serving cell c or the $P_{CMAX}$ is determined on the basis of a power value $P_{EMAX,C}$ configured by the network. The power value $P_{EMAX,C}$ configured by the network may be determined by power information discMaxTxPower for the D2D discovery signal transmission or power information P-Max for D2D communication.

For another example, when a UE which exists inside cell coverage (this may be referred to as IN-COVERAGE: "INC") performs a signal transmission operation based on D2D communication on an SF # N of a specific Cell # C, a value $P_{CMAX,C}(N)$ (and/or $P_{CMAX}(N)$) to be used when determining signal TX power based on D2D communication may be calculated by substituting a maximum (communication) TX power value corresponding to a parameter P-Max of the Cell # C related to WAN UL communication (received via a pre-defined signal (e.g., SIB 1)) to a parameter $P_{EMAX,C}$.

For another example, when a UE which exists outside cell coverage (this may be referred to as OUT-OF-COVERAGE (OOC)) performs a transmission operation of D2D communication, a value $P_{CMAX,C}(N)$ (and/or $P_{CMAX}(N)$) to be used when determining D2D communication TX power may be calculated by substituting a maximum (communication) TX power value corresponding to a predetermined parameter P-Max related to a Carrier # C (received via a pre-defined signal) to a parameter $P_{EMAX,C}$.

For another example, when a UE performs an operation of transmitting a discovery signal on an SF # N of a specific Cell # C, a value $P_{CMAX,C}(N)$ (and/or $P_{CMAX}(N)$) to be used when determining discovery signal TX power may be calculated by substituting a value derived through a pre-defined function to a parameter $P_{EMAX,C}$.

The function may be MIN {a maximum (communication) TX power value (used in D2D communication) corresponding to the parameter P-Max of the Cell # C related to WAN UL communication (received via a pre-defined signal (SIB 1)), a value $P_{PowerClass}$, a maximum (discovery) TX power value (used in discovery signal transmission) corresponding to a parameter discMaxTxPower-r12}. Alternatively, the function may be defined as MIN {a maximum (communication) TX power value (used in D2D communication) corresponding to the parameter P-Max of the Cell # C related to WAN UL communication (received via a pre-defined signal (SIB 1)), a value $P_{PowerClass}$}.

For example, when an in-coverage UE performs a D2D communication transmission operation (or when an out-of-coverage UE performs a D2D communication transmission operation) on an SF # N of a specific Cell # C, a value $P_{CMAX,C}(N)$ (and/or $P_{CMAX}(N)$) to be used when determining D2D communication TX power may be calculated by substituting a result value of the function (or a maximum TX power value corresponding to a parameter discMaxTxPower-r12 relate do the Cell # C (received via a pre-defined signal (SIB19))) to a parameter $P_{EMAX,C}$.

The aforementioned [proposed method #1] may be limitedly applied only to a UE which is capable of both discovery and D2D communication, or a UE which simultaneously performs discovery signal transmission and D2D communication transmission or to which both of the discovery and the D2D communication are configured via higher layer signaling, or a UE which is capable of only the discovery (a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling).

[Proposed method #2] The proposed method #2 relates to a method of determining TX power when transmitting a PSSS (and/or a PSBCH) in association with D2D discovery (hereinafter, also simply referred to as discovery) and/or a method of determining TX power when transmitting a PSSS (and/or a PSBCH) in association with D2D communication. On the basis of some or all of rules described below, TX power may be determined when transmitting the PSSS and/or PSBCH related to the D2D discovery and/or the D2D communication (or triggered (simultaneously) by the D2D discovery and/or the D2D communication).

The following rules may be limitedly applied only to a UE which is capable of both discovery and D2D communication, or a UE which simultaneously performs discovery signal transmission and D2D communication transmission or to which both of the discovery and the D2D communication are configured via higher layer signaling, or a UE which is capable of only the discovery (a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling).

Further, the following rules may be limitedly applied only to a UE supporting D2D on a network (or cell) which configures (or can support) both of the discovery and the D2D communication.

Further, for example, in the following rules, TX power of a PSSS (and/or PSBCH) (related to discovery and/or D2D communication or (simultaneously) triggered by discovery and/or D2D communication) transmitted by a UE which is capable of both discovery and D2D communication (or a UE which simultaneously performs discovery signal transmission and D2D communication transmission or to which both of the discovery and the D2D communication are configured via higher layer signaling) or a UE which is capable of only the discovery (or a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling) may calculate a value $P_{CMAX,C}(N)$ (and/or $P_{CMAX}(N)$) used when determining the TX power of the PSSS (and/or PSBCH) (related to discovery and/or D2D communication or (simultaneously) triggered by discovery and/or D2D communication) by substituting MIN {a maximum D2D communication TX power value, a maximum discovery TX power value} (or MAX {a maximum D2D communication TX power value, a maximum discovery TX power value} or a maximum D2D communication TX power value or a maximum discovery TX power value) to a parameter $P_{EMAX,C}$ according to: 1) whether there is an SIB 19 and/or an SIB 18; and 2) whether there is 'syncConfig' of D2D communication and/or 'syncConfig' of discovery (or whether decoding is possible).

Example #2-1

Assume that a UE which is capable of both discovery and D2D communication (or a UE which simultaneously performs discovery signal transmission and D2D communication transmission or to which both of the discovery and the D2D communication are configured via higher layer signaling) or a UE which is capable of only the discovery (or a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling) exists inside cell coverage. The UE may calculate a value $P_{CMAX,C}(N)$ (and/or $P_{CMAX}(N)$) used when determining TX power of a PSSS (and/or PSBCH) (related to discovery and/or D2D communication or (simultaneously) triggered by discovery and/or D2D communication) by substituting MIN {a maximum D2D communication TX power value, a maximum discovery TX power value} or MAX {a maximum D2D communication TX power value, a maximum discovery TX power value} to a parameter $P_{EMAX,C}$.

Herein, for example, a maximum D2D communication TX power value may be defined as a maximum (D2D communication) TX power value corresponding to a parameter P-Max of a Cell # C related to WAN UL communication, received via a pre-defined signal (e.g., SIB 1).

Further, a maximum discovery TX power value may be defined as a maximum (discovery) TX power value corresponding to a parameter 'discMaxTxPower-r12' related to a Cell # C, received via a pre-defined signal (e.g., SIB 19).

Further, for example, a UE which is capable of both discovery and D2D communication (or a UE which simultaneously performs discovery signal transmission and D2D communication transmission or to which both of the discovery and the D2D communication are configured via higher layer signaling) or a UE which is capable of only the discovery (or a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling), which exists inside cell coverage, may calculate a value $P_{CMAX,c}(N)$ (and/or $P_{CMAX}(N)$) used when determining TX power of a PSSS (and/or PSBCH) related to discovery and/or D2D communication (or (simultaneously) triggered by discovery and/or D2D communication)) by substituting the (aforementioned) maximum D2D communication TX power value (or maximum discovery TX power value) to a parameter $P_{EMAX,C}$.

Further, for example, if a UE which is capable of supporting(/performing) only the discovery (or a UE which performs only the discovery transmission or to which only the discovery is configured for higher layer signaling) exists inside cell coverage, the UE may calculate a value $P_{CMAX,c}(N)$ (and/or $P_{CMAX}(N)$) used when determining TX power of a PSSS (and/or PSBCH) related to the discovery transmission (or triggered by the discovery) by substituting the (aforementioned) maximum D2D communication TX power value (or maximum discovery TX power value) to a parameter $P_{EMAX,C}$.

Further, for example, if a UE which is capable of both discovery and D2D communication (or a UE which simultaneously performs discovery signal transmission and D2D communication transmission or to which both of the discovery and the D2D communication are configured via higher layer signaling) or a UE which is capable of only the discovery (or a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling) exists outside cell coverage, the UE may calculate a value $P_{CMAX,c}(N)$ (and/or $P_{CMAX}(N)$) used when determining TX power of a PSSS (and/or PSBCH) related to D2D communication transmission (or triggered by D2D communication) by substituting a maximum D2D communication TX power value (or a maximum discovery TX power value or MIM {a maximum D2D communication TX power value, a maximum discovery TX power value} or MAX {a maximum D2D communication TX power value, a maximum discovery TX power value}) to a parameter $P_{EMAX,C}$.

For example, (Example #2-1) may be configured to be limitedly applied only to a UE which is capable of both discovery and D2D communication (or which simultaneously performs discovery transmission and D2D communication transmission or to which the discovery and the D2D communication are configured via a higher layer signal) (or a UE which is capable of only the discovery (or which performs only the discovery transmission or to which only the discovery is configured via the higher layer signal) or a UE which is capable of only the D2D communication (or which performs only the D2D communication or to which only the D2D communication is configured via the higher layer signal)).

Further, for example, (Example #2-1) may be supported by receiving (or decoding) an SIB 19 (and/or an SIB 18) irrespective of whether the discovery and/or the D2D communication are possible.

Further, for example, even if the UE which is capable of both the discovery and the D2D communication (or which simultaneously performs the discovery transmission and the D2D communication transmission or to which the discovery and the D2D communication are configured via the higher layer signal) exists inside cell coverage, if only a discovery operation (or discovery transmission) is performed (or is configured (via the higher layer signal)), a value $P_{CMAX,c}(N)$ (and/or $P_{CMAX}(N)$) used when determining TX power of a PSSS (and/or PSBCH) related to the discovery transmission (or triggered by the discovery) may be calculated by substituting a maximum discovery TX power value (or a maximum D2D communication TX power value) to a parameter $P_{EMAX,C}$.

Figure 11:
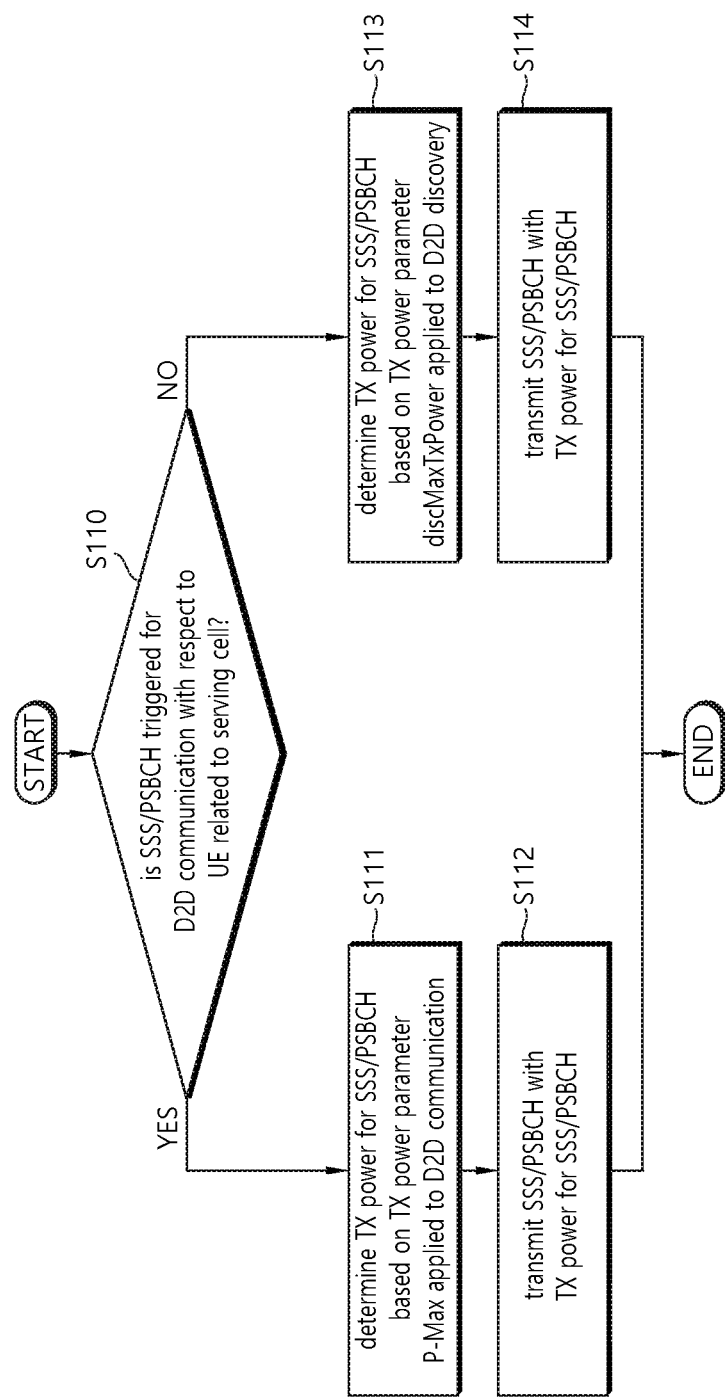
FIG. 11 shows a method of determining TX power for a D2D signal of a UE according to the aforementioned 'Example #2-1'.

FIG. 11 shows a method of determining TX power for a D2D signal of a UE according to the aforementioned 'Example #2-1'.

Referring to FIG. 11, with respect to a UE related to a serving cell, it is determined whether an SSS/PSBCH is triggered for D2D communication (S110).

If the SSS/PSBCH is triggered for the D2D communication (a case where the SSS/PSBCH is triggered for only the D2D communication and a case where the SSS/PSBCH is triggered for both of the D2D communication and D2D discovery may be included), TX power for the SSS/PSBCH is determined on the basis of a TX power parameter P-Max applied to the D2D communication (S111). The SSS, that is, a sidelink synchronization signal, may include a PSSS and/or an SSSS. TX power for the PSSS and the SSSS may be determined either equally or to be different from each other. The TX power for the PSSS and the TX power for the PSBCH may be determined equally. For example, the P-Max may be provided to a UE by being included in an SIB 1. For example, the UE may calculate $P_{CMAX,PSBCH}$ by using a value provided by the P-Max as $P_{EMAX,c}$.

The UE transmits the SSS/PSBCH with the determined TX power for the SSS/PSBCH (S112).

Meanwhile, with respect to the UE related to the serving cell, if the SSS/PSBCH is not triggered for the D2D communication (this may be a case where the SSS/PSBCH is transmitted (only) by the D2D discovery (transmission) (or (only) for the D2D discovery (transmission)), the UE determines TX power for the SSS/PSBCH on the basis of a TX power parameter discMaxTxPower applied to the D2D discovery (S113). The SSS, that is, a sidelink synchronization signal, may include a PSSS and/or an SSSS. TX power for the PSSS and the SSSS may be determined either equally or to be different from each other. For example, the P-Max may be provided to a UE by being included in an SIB 1. For example, the discMaxTxPower may be provided via an SIB 19.

The UE transmits the SSS/PSBCH with the determined TX power for the SSS/PSBCH (S114).

Each value of the TX power for the SSS (SLSS) and the PSBCH may be determined according to whether the SSS (SLSS) and the PSBCH are triggered (only) for the D2D discovery (or triggered (only) by the D2D discovery transmission) or are triggered for the D2D communication (for example, a case where SSS (SLSS) and PSBCH transmission are simultaneously triggered by the D2D communication and the D2D discovery may be included). That is, the TX power for the SSS and the PSBCH (e.g., $P_{PSSS}$, $P_{PSBCH}$) may be determined on the basis of maximum output power $P_{CMAX,c}$ at a serving cell c or $P_{CMAX}$. In this case, the maximum output power $P_{CMAX,c}$ at the serving cell c or the $P_{CMAX}$ is determined on the basis of a power value $P_{EMAX,C}$ configured by the network. The power value $P_{EMAX,C}$ configured by the network may be determined by power information discMaxTxPower for the D2D discovery signal transmission or power information P-Max for D2D communication.

As described above, the SSS/PSBCH may be triggered for the D2D discovery (or by the D2D discovery (transmission)), or may be triggered for the D2D communication (or by the D2D communication (transmission)). However, if it is triggered (or simultaneously by D2D discovery (transmission) and D2D communication (transmission)) for both of the D2D discovery and the D2D communication on the same subframe (previously configured (/signaled) for an SSS/PSCBH transmission usage), how to determine TX power for the SSS/PSBCH transmission may be a matter to be considered.

Figure 12:
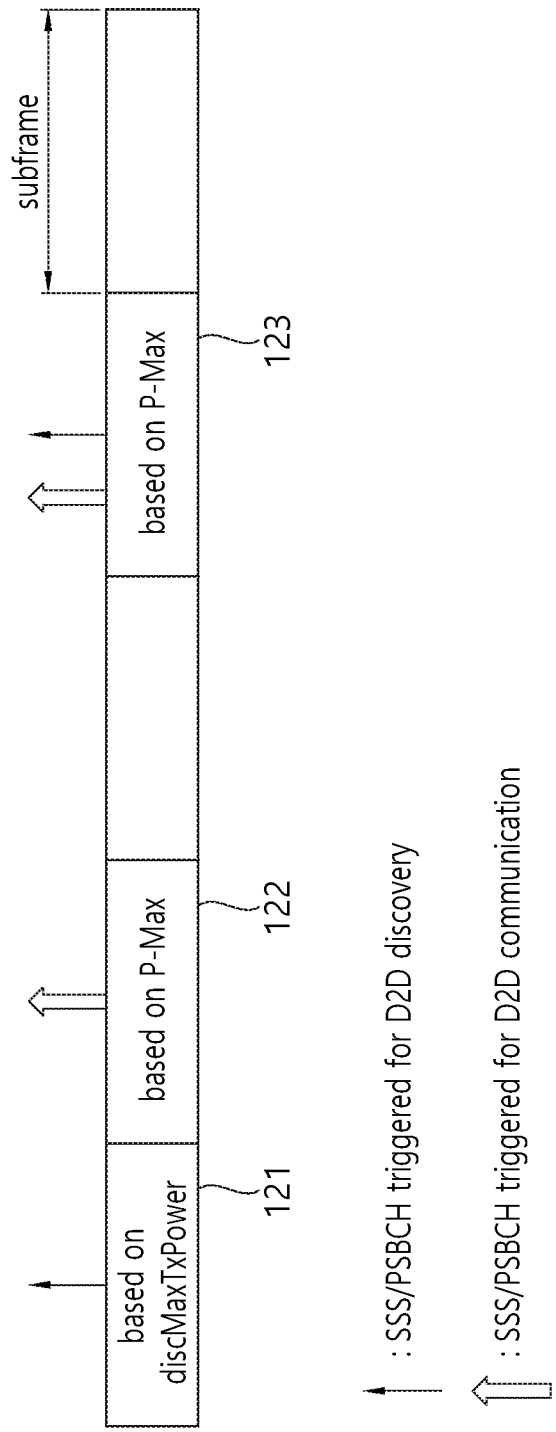
FIG. 12 shows an example of a method of determining TX power when an SSS/PSBCH is triggered for both of D2D discovery and D2D communication (or simultaneously by D2D discovery (transmission) and D2D communication (transmission) on the same subframe.

FIG. 12 shows an example of a method of determining TX power when an SSS/PSBCH is triggered for both of D2D discovery and D2D communication (or simultaneously by D2D discovery (transmission) and D2D communication (transmission) on the same subframe.

Referring to FIG. 12, on a 1st subframe 121, an SSS/PSBCH triggered for (only) the D2D discovery (or by (only) D2D discovery (transmission)) is transmitted. In this case, the SSS/PSBCH is transmitted with TX power determined on the basis of discMaxTxPower. In a 2nd subframe 122, an SSS/PSBCH triggered for (only) the D2D communication (or by (only) the D2D communication (transmission)) is transmitted. In this case, the SSS/PSBCH is transmitted with TX power determined on the basis of P-Max.

However, on a specific subframe 123 (previously configured (/signaled) for an SSS/PSBCH transmission usage), the SSS/PSBCH may be triggered for both of the D2D discovery and the D2D communication (or simultaneously by the D2D discovery (transmission) and the D2D communication (transmission)). In this case, the SSS/PSBCH is transmitted with the TX power determined on the basis of the P-Max. That is, a final TX power value is derived on the basis of the P-Max used in determining of SSS/PSBCH TX power (see 122) for (only) the D2D communication (or by (only) the D2D communication (transmission)). Although such a conclusion is also derived by FIG. 11, it is more clearly shown in FIG. 12. In FIG. 12, a mutual time relation of each of the subframes 121, 122, and 123 is for exemplary purposes only.

Example #2-2 when a UE performs a discovery transmission operation on an SF # N of a specific Cell # C, a TX power value derived according to some or all of equations among the following equations 18 to 25 may be applied to PSSS (and/or PSBCH) transmission of the discovery operation.

Herein, a value $P_{CMAX,C}(N)$ (and/or $P_{CMAX}(N)$) related to PSSS (and/or PSBCH) transmission of the discovery operation, which is calculated by substituting a maximum (communication) TX power value corresponding to a parameter P-Max of a Cell # C related to WAN UL communication, received via a pre-defined signal (SIB 1), to a parameter $P_{EMAX,C}$, is called "PCMAXC_DIS" and "PCMAX_DIS", respectively.

Further, a maximum (discovery) TX power value corresponding to a parameter discMaxTxPower-r12 related to a Cell # C, received via a pre-defined signal (SIB 19), is named as "MAX_DIS".

Further, (Example #2-2) may be configured to be limitedly applied only to a UE which is capable of both discovery and D2D communication (or which simultaneously performs discovery transmission and D2D communication transmission or to which the discovery and the D2D communication are configured via a higher layer signal) (or a UE which is capable of only the discovery (or which performs only the discovery transmission or to which only the discovery is configured via the higher layer signal) or a UE which is capable of only the D2D communication (or which performs only the D2D communication or to which only the D2D communication is configured via the higher layer signal)).

MIN{MAX_DIS,MIN{PCMAXC_DIS,(10 log
$(M_{PSSS})+P_{O\_PSSS}+\alpha_{PSSS}\cdot PL)$}} [dBm]     [Equation 18]

MIN{MAX_DIS,PCMAX_DIS,
MIN{PCMAXC_DIS,(10 log$(M_{PSSS})+P_{O\_PSSS}+$
$\alpha_{PSSS}\cdot PL)$}} [dBm]     [Equation 19]

MAX{MAX_DIS,MIN{PCMAXC_DIS,(10 log
$(M_{PSSS})+P_{O\_PSSS}+\alpha_{PSSS}\cdot PL)$}}[dBm]     [Equation 20]

MAX{MAX_DIS,PCMAX_DIS,
MIN{PCMAXC_DIS,(10 log$(M_{PSSS})+P_{O\_PSSS}+$
$\alpha_{PSSS}\cdot PL)$}} [dBm]     [Equation 21]

MIN{PCMAX_DIS,MIN{MAX_DIS,PCMAX-
C_DIS,(10 log$(M_{PSSS})+P_{O\_PSSS}+\alpha_{PSSS}\cdot PL)$}}
[dBm]     [Equation 22]

MIN {PCMAX_DIS,MIN {MAX_DIS,(10 log
$(M_{PSSS})+P_{O\_PSSS}+\alpha_{PSSS}\cdot PL)$}}[dBm]     [Equation 23]

MAX{PCMAX_DIS,MIN{MAX_DIS,PCMAX-
C_DIS,(10 log$(M_{PSSS})+P_{O\_PSSS}+\alpha_{PSSS}\cdot PL)$}}
[dBm]     [Equation 24]

MAX{PCMAX_DIS,MIN{MAX_DIS,(10 log
$(M_{PSSS})+P_{O\_PSSS}+\alpha_{PSSS}\cdot PL)$}}[dBm]     [Equation 25]

[Proposed method #3] A parameter $P_{CMAX,C}(N)$ (and/or $P_{CMAX}(N)$) used in determining of TX power of a D2D signal transmitted on an SF # N of a specific Cell # C may be calculated by assuming a case where a pre-defined (or signaled) WAN UL signal is transmitted (equally) according to an allocated-resource count/position and/or modulation related to D2D signal transmission.

Herein, for example, the WAN UL signal may be configured through a PUSCH. Applying of this method can also be interpreted such that $MPR_c$ (or MPR) and/or $A\text{-}MPR_c$ (or A-MPR) related to D2D signal transmission are (additionally) defined.

Further, for example, [Proposed method #3] may be applied limitedly only when a single UL cell is configured and/or when multiple UL cells are configured with carrier aggregation (CA) and WAN UL transmission does not exist on another cell (partially or entirely) overlapping with an SF # N for transmitting a D2D signal of a Cell # C.

[Proposed method #4] A rule may be defined such that a parameter $P_{CMAX}(N)$ (and/or $P_{CMAX,C}(N)$) used in determining of TX power for a WAN UL signal transmitted on an SF # N of a specific Cell # C is calculated under the assumption that there is no D2D signal transmission in (some or all of) subframes on another cell overlapping with the SF # N.

Specifically, for example, in case of applying the rule to the aforementioned 'CASE (1)', even if D2D signal transmission and WAN UL signal transmission must be performed (or scheduled) respectively in an SF # Q of a Cell # A and an SF # P of a Cell # B, a parameter $P_{CMAX}(P)$ (and/or $P_{CMAX,B}(P)$) used in determining of TX power of the WAN UL signal transmitted on the SF # P of the Cell # B may be calculated under the assumption that there is no D2D signal transmission in the SF # Q of the Cell # A.

For another example, in case of applying the rule to the aforementioned 'CASE (2)', even if D2D signal transmission, WAN UL signal transmission, and WAN UL signal transmission must be performed (or scheduled) respectively in an SF # Q of a Cell # A, an SN # P of a Cell # B, and an SB #(P+1) of the Cell # B, a parameter $P_{CMAX}(P)$ (and/or $P_{CMAX,B}(P)$) and a parameter $P_{CMAX}(P+1)$ (and/or $P_{CMAX,B}(P+1)$) may be calculated under the assumption that there is no D2D signal transmission in the SF # Q of the Cell # A.

By applying this method, TX power of a D2D signal does not have an effect on determining of TX power of a WAN UL signal.

For another example, if there is D2D signal transmission in a subframe on another cell partially or entirely overlapping with the SF # N, a parameter $P_{CMAX}(N)$ (and/or $P_{CMAX,C}(N)$) used in determining of TX power of a WAN UL signal transmitted in an SF # N of a specific Cell # C may be calculated under the assumption that a pre-defined (or signaled) WAN UL signal is transmitted (together) (in addition to WAN UL signal transmission in the SF # N of the Cell # C) according to an allocated-resource count/position and/or modulation related to D2D signal transmission.

Herein, when a D2D signal is transmitted in a subframe on another Cell # X (partially or entirely) overlapping with the SF # C of the Cell # C for transmitting a WAN UL signal, a parameter $P_{CMAX}(N)$ (and/or $P_{CMAX,X}(N)$) used in determining of TX power for the D2D signal may be calculated under the assumption that a pre-defined (or signaled) WAN UL signal is transmitted (together) (in a Cell # X) in addition to WAN UL signal transmission in the SF # N of the Cell # C according to an allocated-resource count/position and/or modulation related to D2D signal transmission.

Specifically, for example, in case of applying the rule to 'CASE (1)', if D2D signal transmission and WAN UL signal transmission must be performed (or scheduled) respectively in the SF # Q of the Cell # A and the SF # P of the Cell # B, a parameter $P_{CMAX}(P)$ (and/or $P_{CMAX,B}(P)$) used in determining of TX power of a WAN UL signal on the SF # P of the Cell # B may be calculated under the assumption that a pre-defined (or signaled) WAN UL signal is transmitted (together) in the SF # Q of the Cell # A (in addition to WAN UL signal transmission in the SF # N of the Cell # C) according to an allocated-resource count/position/modulation related to D2D signal transmission.

When applying this method, TX power of the D2D signal has an effect on determining of TX power of the WAN UL signal.

Further, for example, [Proposed method #4] may be limitedly applied only to intra-band contiguous carrier aggregation (contiguous resource allocation and/or non-contiguous resource allocation may be used) and/or intra-band non-contiguous carrier aggregation (two UL carriers may be used).

[Proposed method #5] TX power of a D2D signal transmitted in an SF # N of a specific Cell # C may be calculated according to some or all of rules described below.

A rule may be defined such that D2D_TXP(Q) and/or D2D_TXP(Q+1) derived through the following rules are finally determined through an operation of MIN {D2D_TXP (Q), a maximum (discovery) TX power value corresponding to a parameter discMaxTxPower-r12} (or MAX {D2D_TXP (Q), a maximum (discovery) TX power value corresponding to a parameter discMaxTxPower-r12}) and/or MIN {D2D_TXP(Q+1), a maximum (discovery) TX power value corresponding to a parameter discMaxTxPower-r12}(or MAX {D2D_TXP(Q+1), a maximum (discovery) TX power value corresponding to a parameter discMaxTxPower-r12}).

Example #5-1

For 'CASE (1)', for example, if D2D signal transmission and WAN UL signal transmission must be (simultaneously) performed respectively on the SF # Q of the Cell # A and the SF # P of the Cell # B, TX power of a D2D signal in the SF # Q of the Cell # A may be determined according to the following rule.

1) At a (partially or entirely) overlapping time (subframe) on other cells, the TX power of the D2D signal in the SF # Q of the Cell # A may be determined on the basis of $P_{CMAX}(P)$ ("PCMAX_WO(P)") (or $P_{CMAX\_L}(P)$ ("PCMAX-L_WO(P)")) or $P_{CMAX,B}(P)$ related to WAN UL signal transmission (in the SF # P of the Cell # B) calculated under the assumption that there is no D2D signal transmission.

If it is assumed that WAN UL signal TX power in the SF # P of the Cell # B determined by an open-loop/closed-loop power control (OLPC/CLPC) parameter is denoted by "WAN_CONP(P)", final WAN UL signal TX power at a corresponding time (this is called "WAN_TXP(P)") may be determined as MIN {PCMAX_WO(P), MIN {$P_{CMAX,B}(P)$, WAN_CONP(P)}}.

2) Under the assumption that a pre-defined (or signaled) WAN UL signal is transmitted together according to an allocated-resource count/position/modulation related to D2D signal transmission in addition to WAN UL signal transmission in the SF # P of the Cell # B, the TX power of the D2D signal in the SF # Q of the Cell # A may be determined on the basis of the calculated $P_{CMAX}(Q(/P))$ (this is called "PCMAX_DW(Q(/P))") (or $P_{CMAX\_L}(Q(/P))$ ("PCMAXL_DW(Q(/P))")) or $P_{CMAX,A}(Q(/P))$ related to D2D signal transmission (in the SF # Q of the Cell # A).

Herein, in this rule, WAN UL signal transmission (in the SF # P of the Cell # B) may be interpreted as a reference for calculating D2D signal TX power (in the SF # Q of the Cell # A) (e.g., PCMAX_DW(P(/Q)) (or PCMAXL_DW(P(/Q)))).

For example, if TX power of a D2D signal at the SF # Q of the Cell # A, which is determined by an open-loop power control (OLPC) parameter, is assumed as "D2D_CONP(Q)", TX power of a final D2D signal at a corresponding time (this is denoted by "D2D_TXP(Q)") may be determined as MIN {(PCMAX_DW(Q(/P))−WAN_TXP (P)), MIN {PCMAX,A(Q), D2D_CONP(Q)}}. If this method is applied, it may be interpreted that WAN_TXP(P) is not influenced by D2D_TXP(Q). Further, for example, in the above equation, PCMAX_DW(Q(/P)) may be replaced with $P_{PowerClass}$ or MIN {$P_{EMAX,A}$, $P_{PowerClass}$}.

For example, if D2D_TXP(Q) cannot satisfy an emission requirement pre-defined (or signaled) in a simultaneous transmission situation of a WAN UL signal/D2D signal, a rule may be defined such that D2D_TXP(Q) is preferentially decreased until the emission requirement is satisfied.

For another example, in order to solve such a problem, a rule may be defined such that a pre-defined (or signaled) power offset value is additionally applied to (final) D2D_TXT(Q). For another example, if D2D_TXP(Q) cannot satisfy the pre-defined (or signaled) emission requirement in the simultaneous transmission situation of the WAN UL signal/D2D signal, a rule may be defined such that transmission of the D2D signal is omitted.

Example #5-2

For 'CASE (1)', for example, if D2D signal transmission is performed in an SF # Q of a Cell # A and WAN UL signal transmission is not performed in an SF # P of a Cell # B, a rule may be defined such that TX power of a D2D signal in the SF # Q of the Cell # A is determined according to the following rule.

1) Under the assumption that a pre-defined (or signaled) WAN UL signal is transmitted according to an allocated-resource count/position/modulation related to D2D signal transmission, TX power of a D2D signal in the SF # Q of the Cell # A may be determined on the basis of $P_{CMAX}(Q)$ ("PCMAX_OD(Q)") (or $P_{CMAX\_L}(Q)$ ("PCMAXL_OD(Q)")) or $P_{CMAX,A}(Q)$ related to D2D signal transmission (in the SF # Q of the Cell # A).

For example, if TX power of a D2D signal at the SF # Q of the Cell # A, which is determined by an open-loop power control (OLPC) parameter, is assumed as "D2D_CONP(Q)", TX power of a final D2D signal at a corresponding time (this is denoted by "D2D_TXP(Q)") may be determined as MIN {PCMAX_OD(Q), MIN {$P_{CMAX,A}(Q)$, D2D_CONP(Q)}}.

Further, for example, in the above equation, PCMAX_OD(Q) related to determining of D2D_TXP(Q) may be replaced with $P_{PowerClass}$ or MIN {$P_{EMAX,A}$, $P_{PowerClass}$}.

Example #5-3

For 'CASE (1)', if D2D signal transmission and WAN UL signal transmission must be (simultaneously) performed respectively on the SF # Q of the Cell # A and the SF # P of the Cell # B, the TX power of the D2D signal in the SF # Q of the Cell # A may be determined according to the following rule.

Under the assumption that a pre-defined (or signaled) WAN UL signal is transmitted together in addition to WAN UL signal transmission in the SF # P of the Cell # B according to an allocated-resource count/position/modulation related to D2D signal transmission, the TX power of the D2D signal in the SF # Q of the Cell # A may be determined on the basis of calculated $P_{CMAX,A}(Q)$ related to D2D signal transmission (in the SF # Q of the Cell # A), $P_{CMAX,B}(P)$ related to WAN UL signal transmission (in the SF # P of the Cell # B) and $P_{CMAX}(Q(/P))$ related to D2D signal transmission/WAN UL signal transmission ("PCMAX_DW(Q(/P))") (or $P_{CMAX\_L}(Q(/P))$ ("PCMAXL_DW(Q(/P))")).

Herein, for example, according to such a rule, WAN UL signal transmission (in the SF # P of the Cell # B) may be interpreted as a reference for calculating D2D signal TX power (in the SB # Q of the Cell # A) (e.g., e.g., PCMAX_DW(P(/Q)) (or PCMAXL_DW(P(/Q)))).

For example, if TX power of a D2D signal in the SF # Q of the Cell # A determined by an open-loop power control (OLPC) parameter is assumed as "D2D_CONP(Q)" and if TX power of a WAN UL signal in the SF # P of the Cell # B determined by an open-loop power control (OLPC)/closed-loop power control (CLPC) parameter is assumed as "WAN_CONP(P)", TX power of a final WAN UL signal in the SF # P of the Cell # B ("WAN_TXP(P)") may be determined as MIN {PCMAX_DW(P(/Q)), MIN {$P_{CMAX,B}(P)$, WAN_CONP(P)}}, and TX power of a final D2D signal in the SF # Q of the Cell # A ("D2D_TXP(Q)") may be determined as MIN {(PCMAX_DW(Q(/P))–WAN_TXP(P)), MIN {$P_{CMAX,A}(Q)$, D2D_CONP(Q)}}.

If this method is applied, it may be interpreted that WAN_TXP(P) is influenced by D2D_TXP(Q). Further, for example, in the above equation, PCMAX_DW(Q(/P)) may be replaced with $P_{PowerClass}$ or MIN {$P_{EMAX,A}$, $P_{PowerClass}$}.

For example, if D2D_TXP(Q) cannot satisfy the pre-defined (or signaled) emission requirement in the simultaneous transmission situation of the WAN UL signal/D2D signal, D2D_TXP(Q) may be preferentially decreased until the emission requirement is satisfied. For another example, in order to solve such a problem, a pre-defined (or signaled) power offset value may be additionally applied to (final) D2D_TXT(Q). For another example, if D2D_TXP(Q) cannot satisfy the pre-defined (or signaled) emission requirement in the simultaneous transmission situation of the WAN UL signal/D2D signal, a rule may be defined such that transmission of the D2D signal is omitted.

Example #5-4

For CASE (1), for example, if D2D signal transmission and WAN UL signal transmission must be (simultaneously) performed respectively on the SF # Q of the Cell # A and the SF # P of the Cell # B, the TX power of the D2D signal in the SF # Q of the Cell # A may be determined according to the following rule.

At a (partially or entirely) overlapping subframe (time) on other cell(s), the TX power of the D2D signal in the SF # Q of the Cell # A may be determined on the basis of $P_{CMAX}(P)$ ("PCMAX_WO(P)") (or $P_{CMAX\_L}(P)$ ("PCMAXL_WO(P)")) or $P_{CMAX,B}(P)$ related to WAN UL signal transmission (in the SF # P of the Cell # B) calculated under the assumption that there is no D2D signal transmission.

For example, if TX power of a WAN UL signal in an SF # P of the Cell # B determined by an open-loop power control/closed-loop power control parameter is assumed as "WAN_CONP(P)", TX power of a final WAN UL signal at a corresponding time("WAN_TXP(P)") may be determined as MIN {PCMAX_WO(P), MIN {$P_{CMAX,B}(P)$, WAN_CONP(P)}}.

Under the assumption that a pre-defined (or signaled) WAN UL signal is transmitted together in addition to WAN UL signal transmission in the SF # P of the Cell # B according to an allocated-resource count/position/modulation related to D2D signal transmission, TX power of a D2D signal in the SF # Q of the Cell # A may be determined on the basis of $P_{CMAX}(Q(/P))$ ("PCMAX_DW(Q(/P))") (or $P_{CMAX\_L}(Q(/P))$ ("PCMAXL_DW(Q(/P))")) or $PP_{CMAX,A}(Q(/P))$ related to calculated D2D signal transmission (in the SF # Q of the Cell # A).

In this rule, WAN UL signal transmission (in the SF # P of the Cell # B) may be interpreted as a reference for calculating D2D signal TX power (in the SF # Q of the Cell # A) (e.g., PCMAX_DW(P(/Q)) (or PCMAXL_DW(P(/Q)))).

If TX power of a D2D signal in the SF # Q of the Cell # A determined by an open-loop power control parameter is assumed as "D2D_CONP(Q)", TX power of a final D2D signal at a corresponding time("D2D_TXP(Q)") may be determined as MIN {(NEW_VAL–WAN_TXP(P)), MIN {$P_{CMAX,A}(Q)$, D2D_CONP(Q)}}. Herein, for example, NEW_VAL may be determined as MIN {PCMAXL_WO(P), PCMAXL_DW(Q(/P))} (or MAX {PCMAXL_WO(P), PCMAXL_DW(Q(/P))} or MIN {PCMAX_WO(P), PCMAX_DW(Q(/P))} or MAX {PCMAX_WO(P), PCMAX_DW(Q(/P))} or PCMAXL_WO(P) or PCMAXL_DW(Q(/P))). Further, for example, NEW_VAL related to determining of D2D_TXP(Q) may be replaced with $P_{PowerClass}$ or MIN {$P_{EMAX,A}$, $P_{PowerClass}$}.

For example, if D2D_TXP(Q) cannot satisfy an emission requirement pre-defined (or signaled) in a simultaneous transmission situation of a WAN UL signal/D2D signal, a rule may be defined such that D2D_TXP(Q) is preferentially decreased until the emission requirement is satisfied. For another example, in order to solve such a problem, a rule may be defined such that a pre-defined (or signaled) power offset value is additionally applied to (final) D2D_TXT(Q). For another example, if D2D_TXP(Q) cannot satisfy the pre-defined (or signaled) emission requirement in the simultaneous transmission situation of the WAN UL signal/D2D signal, a rule may be defined such that transmission of the D2D signal is omitted.

Figure 13:
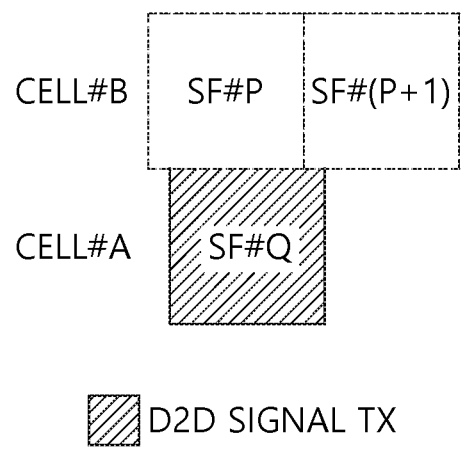
FIG. 13 is an example of CASE (2).

FIG. 13 is an example of CASE (2).

Referring to FIG. 13, an SF # Q of a Cell # A and an SF # P of a Cell # B are not time-synchronized, and the SF # Q of the Cell # A for transmitting a D2D signal partially overlaps with SFs # P and (P+1) of a Cell # B for transmitting a WAN UL signal.

Example #5-5

Under the premise of the aforementioned 'CASE (2)' or a modified example of 'CASE (2)' of FIG. 13, if D2D signal transmission, WAN UL signal transmission, WAN UL signal transmission, and WAN UL signal transmission must be (simultaneously) performed respectively on the SF # Q of the Cell # A, the SF # P of the Cell # B, and the SF #(P+1) of the Cell # B, TX power of a D2D signal in the SF # Q of the Cell # A may be determined according to the following rule.

Herein, for example, (Example #5-5) may be interpreted as a case where a WAN UL cell (carrier) leads a D2D cell (carrier). Further, for example, in FIG. 13, a SF index 'Q' of the Cell # A may be assumed as an index 'K', and an SF index 'P (/(P+1))' of the Cell # B may be assumed as 'K (/(K+1))'.

At a (partially or entirely) overlapping time(s) on other cells, the TX power of the D2D signal in the SF # Q of the Cell # A may be determined on the basis of $P_{CMAX}(P)$ ("PCMAX_WO(P)") (or $P_{CMAX\_L}(P)$ ("PCMAXL_WO (P)")) or $P_{CMAX,B}(P)$ related to WAN UL signal transmission in the SF # P of the Cell # B and $P_{CMAX}(P+1)$ ("PCMAX_WO(P+1)") (or $P_{CMAX\_L}(P+1)$ ("PCMAXL_WO(P+1)")) or $P_{CMAX,B}(P+1)$ related to WAN UL signal transmission in the SF #(P+1) of the Cell # B, calculated under the assumption that there is no D2D signal transmission.

For example, if TX power of a WAN UL signal in an SF # P of the Cell # B determined by an open-loop/closed-loop power control parameter is assumed as "WAN_CONP (P)" and if TX power of a WAN UL signal in an SF #(P+1) of the Cell # B is assumed as "WAN_CONP(P+1)", TX power of a final WAN UL signal ("WAN_TXP(P)") in the SF # P of the Cell # B may be determined as MIN {PCMAX_WO(P), MIN {$P_{CMAX,B}(P)$, WAN_CONP(P)}}, and TX power of a final WAN UL signal in an SF #(P+1) of the Cell # B ("WAN_TXP(P+1)") may be determined as MIN {PCMAX_WO(P+1), MIN {$P_{CMAX,B}(P+1)$, WAN_CONP (P+1)}}.

Under the assumption that WAN UL signal transmission in the SF # P of the Cell # B partially overlaps with a pre-defined (or signaled) WAN UL signal transmitted in the SF # Q of the Cell # A according to an allocated-resource count/position/modulation related to D2D signal transmission, TX power for a D2D signal in the SF # Q of the Cell # A may be determined on the basis of calculated $P_{CMAX}(P, Q)$ related to D2D signal transmission (in the SF # Q of the Cell # A) ("PCMAX_DW(P, Q)") (or $P_{CMAX\_L}(P, Q)$ ("PCMAXL_DW(P, Q)")) or $P_{CMAX,A}(P, Q)$.

Herein, for example, in this rule, WAN UL signal transmission (in the SF # P of the Cell # B) may be interpreted as a reference for calculating D2D signal TX power (in the SF # Q of the Cell # A) (e.g., PCMAX_DW(Q, (P+1)) (or PCMAXL_DW(Q, (P+1)))).

Under the assumption that WAN UL signal transmission in the SF #(P+1) of the Cell # B partially overlaps with a pre-defined (or signaled) WAN UL signal transmitted in the SF # Q of the Cell # A according to an allocated-resource count/position/modulation related to D2D signal transmission, TX power for a D2D signal in the SF # Q of the Cell # A may be determined on the basis of calculated $P_{CMAX}(Q, (P+1))$ related to D2D signal transmission (in the SF # Q of the Cell # A) ("PCMAX_DW(Q, (P+1))") (or $P_{CMAX\_L}(Q, (P+1))$ ("PCMAXL_DW(Q, (P+1))")) or $P_{CMAX,A}(Q, (P+1))$.

Herein, for example, in this rule, WAN UL signal transmission (in the SF #(P+1) of the Cell # B) may be interpreted as a reference for calculating D2D signal TX power (in the SF # Q of the Cell # A) (e.g., PCMAX_DW(Q, (P+1)) (or PCMAXL_DW(Q, (P+1)))).

For example, $P_{CMAX,A}(P, Q)$ and $P_{CMAX,A}(Q, (P+1))$ may have the same value.

For example, if TX power of a D2D signal at the SF # Q of the Cell # A, which is determined by an open-loop power control parameter, is assumed as "D2D_CONP(Q)", TX power of a final D2D signal ("D2D_TXP(Q)") at a corresponding time may be determined as MIN {(NEW_VAL-MAX_WANVAL), MIN {$P_{CMAX,A}(Q, Q)$, D2D_CONP (Q)}}.

Herein, for example, NEW_VAL may be determined as MIN {PCMAXL_DW(P, Q), PCMAXL_DW(Q, (P+1))} (or MAX {PCMAXL_DW(P, Q), PCMAXL_DW(Q, (P+1))} or MIN {PCMAX_DW(P, Q), PCMAX_DW(Q, (P+1))} or MAX {PCMAX_DW(P, Q), PCMAX_DW(Q, (P+1))} or PCMAXL_DW(P, Q) or PCMAXL_DW(Q, (P+1)) or PCMAX_DW(P, Q) or PCMAX_DW(Q, (P+1))).

Further, for example, MAX_WANVAL may be determined as MAX {WAN_TXP(P), WAN_TXP(P+1)}. Furthermore, for example, NEW_VAL related to determining of D2D_TXP(Q) may be replaced with $P_{PowerClass}$ or MIN {$P_{EMAX,A}$, $P_{PowerClass}$}.

For example, if D2D_TXP(Q) cannot satisfy an emission requirement pre-defined (or signaled) in a simultaneous transmission situation of a WAN UL signal/D2D signal, a rule may be defined such that D2D_TXP(Q) is preferentially decreased until the emission requirement is satisfied.

For another example, in order to solve such a problem, a rule may be defined such that a pre-defined (or signaled) power offset value is additionally applied to (final) D2D_TXT(Q).

For another example, if D2D_TXP(Q) cannot satisfy the pre-defined (or signaled) emission requirement in the simultaneous transmission situation of the WAN UL signal/D2D signal, a rule may be defined such that transmission of the D2D signal is omitted.

Figure 14:
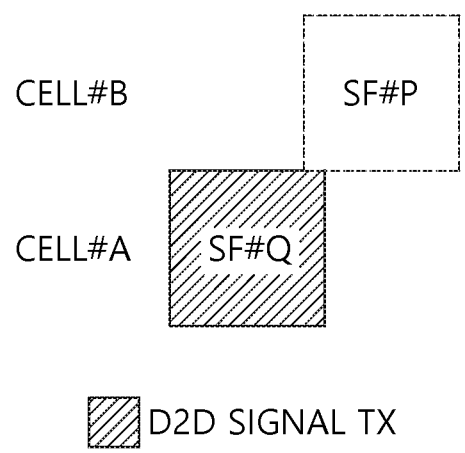
FIG. 14 is another modified example of 'CASE (2)'.

FIG. 14 is another modified example of 'CASE (2)'.

Referring to FIG. 14, an SF # Q of a Cell # A and an SF # P of a Cell # B are not time-synchronized, and the SF # Q of the Cell # A for transmitting a D2D signal partially overlaps with the SF # P of the Cell # B.

Example #5-6

For the aforementioned 'CASE (2)' or a modified example for CASE (2) exemplified in FIG. 14, for example, if D2D signal transmission and WAN UL signal transmission must be (simultaneously) performed respectively on the SF # Q of the Cell # A and the SF # P of the Cell # B, TX power for a D2D signal in the SF # Q of the Cell # A may be determined according to the following rule.

Herein, for example, (Example #5-6) may be interpreted as a case where a D2D cell (carrier) leads a WAN UL cell (carrier) (or a case where the WAN UL cell (carrier) leads the D2D cell (carrier)). Further, for example, in FIG. 14, a SF index 'Q' of the Cell # A may be assumed as an index 'K', and an SF index 'P' of the Cell # B may be assumed as '(K+1) (or 'K')'.

At a (partially or entirely) overlapping time (subframe) on other cells, the TX power of the D2D signal in the SF # Q of the Cell # A may be determined on the basis of $P_{CMAX}(P)$ ("PCMAX_WO(P)") (or $P_{CMAX\_L}(P)$ ("PCMAXL_WO (P)")) or $P_{CMAX,B}(P)$ related to WAN UL signal transmission in the SF # P of the Cell # B, calculated under the assumption that there is no D2D signal transmission.

For example, if TX power of a WAN UL signal in an SF # P of the Cell # B determined by an open-loop power control/closed-loop power control parameter is assumed as "WAN_CONP(P)", TX power of a final WAN UL signal ("WAN_TXP(P)") in the SF # P of the Cell # B may be determined as MIN {PCMAX_WO(P), MIN {$P_{CMAX,B}(P)$, WAN_CONP(P)}}.

Under the assumption that WAN UL signal transmission in the SF # P of the Cell # B partially overlaps with a pre-defined (or signaled) WAN UL signal transmitted in the SF # Q of the Cell # A according to an allocated-resource count/position/modulation related to D2D signal transmission, TX power for a D2D signal in the SF # Q of the Cell # A may be determined on the basis of calculated $P_{CMAX}(P, Q)$ related to D2D signal transmission (in the SF # Q of the Cell # A) ("PCMAX_DW(P, Q)") (or $P_{CMAX\_L}(P, Q)$ ("PCMAXL_DW(P, Q)")) or $P_{CMAX,A}(P, Q)$.

Herein, for example, in this rule, WAN UL signal transmission (in the SF # P of the Cell # B) may be interpreted as a reference for calculating D2D signal TX power (in the SF # Q of the Cell # A) (e.g., PCMAX_DW(Q, P) (or PCMAXL_DW(Q, P))).

For example, if TX power of a D2D signal at the SF # Q of the Cell # A, which is determined by an open-loop power control parameter, is assumed as "D2D_CONP(Q)", TX power of a final D2D signal ("D2D_TXP(Q)") at a corresponding time may be determined as MIN {(NEW_VAL−MAX_WANVAL), MIN {$P_{CMAX,A}(Q, P)$, D2D_CONP (Q)}}.

Herein, for example, NEW_VAL may be determined as MIN {PCMAXL_WO(P), PCMAXL_DW(Q, P)} (or MAX {PCMAX_WO(P), PCMAXL_DW(Q, P)} or MIN {PCMAX_WO(P), PCMAX_DW(Q, P)} or MAX {PCMAX_WO(P), PCMAX_DW(Q, P)} or PCMAXL_WO(P) or PCMAXL_DW(Q, P) or PCMAX_WO(P) or PCMAX_DW(Q, P)).

Further, for example, MAX_WANVAL may be determined as WAN_TXP(P). Furthermore, for example, in the above equation, NEW_VAL related to determining of D2D_TXP(Q) may be replaced with $P_{PowerClass}$ or MIN {$P_{EMAX,A}$, $P_{PowerClass}$}.

For example, if D2D_TXP(Q) cannot satisfy an emission requirement pre-defined (or signaled) in a simultaneous transmission situation of a WAN UL signal/D2D signal, a rule may be defined such that D2D_TXP(Q) is preferentially decreased until the emission requirement is satisfied. For another example, in order to solve such a problem, a rule may be defined such that a pre-defined (or signaled) power offset value is additionally applied to (final) D2D_TXT(Q). For another example, if D2D_TXP(Q) cannot satisfy the pre-defined (or signaled) emission requirement in the simultaneous transmission situation of the WAN UL signal/D2D signal, a rule may be defined such that transmission of the D2D signal is omitted.

Figure 15:
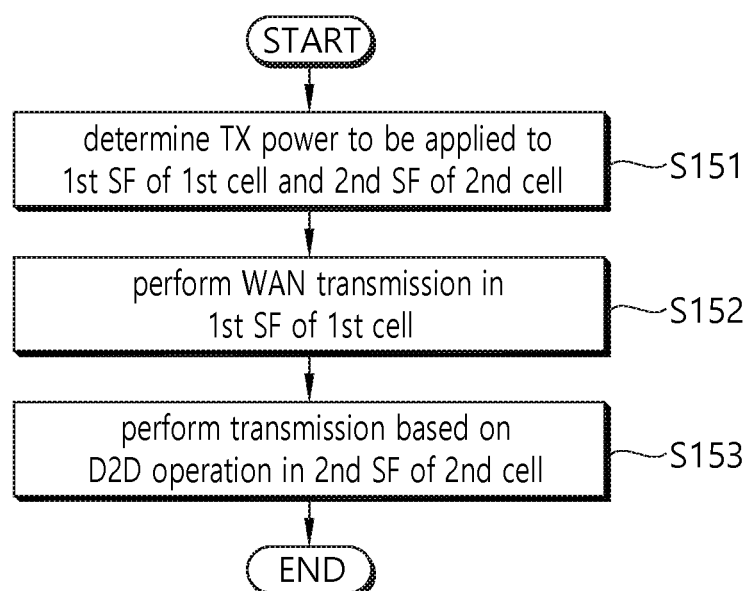
FIG. 15 shows a power control method according to an embodiment of the present invention.

FIG. 15 shows a power control method according to an embodiment of the present invention.

Referring to FIG. 15, a UE determines TX power to be applied to a $1^{st}$ SF of a $1^{st}$ cell (1st carrier) and a $2^{nd}$ SF of a $2^{nd}$ cell ($2^{nd}$ carrier) (S151).

The UE performs WAN transmission in the $1^{st}$ SF of the $1^{st}$ cell (S152), and performs transmission based on a D2D operation in the $2^{nd}$ SF of the $2^{nd}$ cell (S153).

In this case, if the $1^{st}$ SF and the $2^{nd}$ SF partially overlap temporally, TX power for the WAN transmission at the $1^{st}$ SF and transmission based on the D2D operation at the $2^{nd}$ SF may be determined on the basis of maximum output power $P_{CMAX}$ determined for the $1^{st}$ SF of the $1^{st}$ cell. That is, a WAN UL cell (or a subframe for transmitting a WAN UL signal) may be a reference for calculating $P_{CMAX}$ (and/or $P_{CMAX\_L}$ and/or $P_{CMAX\_H}$) related to transmission based on a D2D operation (performed in another cell (carrier)) and the WAN UL transmission.

In the above method, the $1^{st}$ SF may temporally lead the $2^{nd}$ SF as shown in FIG. 13, or the $1^{st}$ SF may temporally lag the $2^{nd}$ SF. The $1^{st}$ cell and the $2^{nd}$ cell may be cells of different frequencies. The $1^{st}$ and $2^{nd}$ cells may be expressed respectively as $1^{st}$ and $2^{nd}$ carriers.

FIG. 16 shows again the sub-figure (b) of FIG. 9 for convenience.

Figure 16:
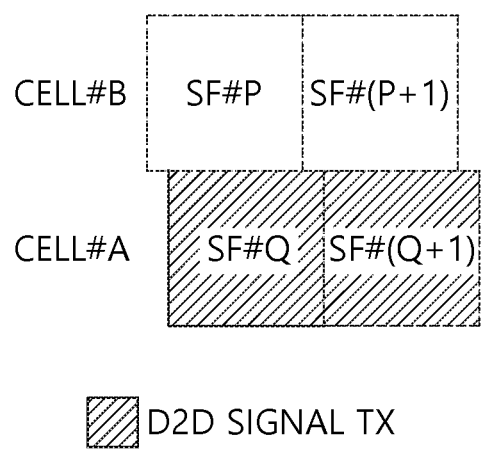
FIG. 16 shows again the sub-figure (b) of FIG. 9 for convenience.

Referring to FIG. 16, an SF # Q and SF # Q+1 of a Cell # A and an SF # P and SF # P+1 of a Cell # B are not aligned temporally. The SF # Q of the Cell # A partially overlaps with the SF # P+1 of the Cell # B, and the SFs of the Cell # B temporally lead the SFs of the Cell # A. FIG. 16 shows 'CASE (2)'

Example #5-7

For 'CASE (2)' of FIG. 16, for example, if D2D signal transmission, D2D signal transmission, WAN UL signal transmission, and WAN UL signal transmission must be (simultaneously) performed respectively on the SF # Q of the Cell # A, the SF #(Q+1) of the Cell # A, the SF # P of the Cell # B, and the SF #(P+1) of the Cell # B, a rule may be defined such that Tx power of a D2D signal in the SF # Q of the Cell # A and TX power of a D2D signal in the SF #(Q+1) of the Cell # A are determined according to the following rule.

Herein, for example, (Example #5-7) may be interpreted as a case where a WAN UL cell (carrier) leads a D2D cell (carrier). Further, for example, in FIG. 16, an SF 'Q (/(Q+1))' of the Cell # A may be assumed as 'K (/(K+1))', and an SF 'P (/(P+1))' of the Cell # B may be assumed as 'K (/(K+1))'.

At a (partially or entirely) overlapping time (subframe) on other cells, the TX power of the D2D signal in the SF # Q of the Cell # A and the TX power of the D2D signal in the SF #(Q+1) of the Cell # A may be determined on the basis of $P_{CMAX}(P)$ ("PCMAX_WO(P)") (or $P_{CMAX\_L}(P)$ ("PCMAXL_WO(P)")) or $P_{CMAX,B}(P)$ related to WAN UL signal transmission in the SF # P of the Cell # B and $P_{CMAX}(P+1)$ ("PCMAX_WO(P+1)") (or $P_{CMAX\_L}(P+1)$ ("PCMAXL_WO(P+1)")) or $P_{CMAX,B}(P+1)$ related to WAN UL signal transmission in the SF #(P+1) of the Cell # B, calculated under the assumption that there is no D2D signal transmission.

For example, if TX power of a WAN UL signal in an SF # P of the Cell # B determined by an open-loop power control/closed-loop power control parameter is assumed as "WAN_CONP(P)" and if TX power of a WAN UL signal in an SF #(P+1) of the Cell # B is assumed as "WAN_CONP (P+1)", TX power of a final WAN UL signal ("WAN_TXP (P)") in the SF # P of the Cell # B may be determined as MIN {PCMAX_WO(P), MIN {$P_{CMAX,B}$(P), WAN_CONP(P)}}, and TX power of a final WAN UL signal in an SF #(P+1) of the Cell # B ("WAN_TXP(P+1)") may be determined as MIN {PCMAX_WO(P+1), MIN {$P_{CMAX,B}$(P+1), WAN_CONP(P+1)}}.

Under the assumption that WAN UL signal transmission in the SF # P of the Cell # B partially overlaps with a pre-defined (or signaled) WAN UL signal transmitted in the SF # Q of the Cell # A according to an allocated-resource count/position/modulation related to D2D signal transmission, a rule may be defined such that TX power for a D2D signal in the SF # Q of the Cell # A and TX power of a D2D signal in the SF #(Q+1) of the Cell # A are determined on the basis of calculated $P_{CMAX}$(P, Q) related to D2D signal transmission (in the SF # Q of the Cell # A) ("PCMAX_DW (P, Q)") (or $P_{CMAX\_L}$(P, Q) ("PCMAXL_DW(P, Q)")) or $P_{CMAX,A}$(P, Q).

Herein, for example, in this rule, WAN UL signal transmission (in the SF # P of the Cell # B) may be interpreted as a reference for calculating D2D signal TX power (in the SF # Q of the Cell # A) (e.g., PCMAX_DW(P, Q) (or PCMAXL_DW(P, Q))).

Under the assumption that WAN UL signal transmission in the SF #(P+1) of the Cell # B partially overlaps with a pre-defined (or signaled) WAN UL signal transmitted in the SF # Q of the Cell # A (according to an allocated-resource count/position/modulation related to D2D signal transmission), a rule may be defined such that TX power for a D2D signal in the SF # Q of the Cell # A and TX power of a D2D signal in the SF #(Q+1) of the Cell # A are determined on the basis of calculated $P_{CMAX}$(Q, (P+1)) related to D2D signal transmission in the SF # Q of the Cell # A ("PCMAX_DW (Q, (P+1))") (or $P_{CMAX\_L}$(Q, (P+1)) ("PCMAXL_DW(Q, (P+1))")) or $P_{CMAX,A}$(Q, (P+1)).

Herein, for example, in this rule, WAN UL signal transmission (in the SF #(P+1) of the Cell # B) may be interpreted as a reference for calculating D2D signal TX power (in the SF # Q of the Cell # A) (e.g., PCMAX_DW(Q, (P+1)) (or PCMAXL_DW(Q, (P+1)))).

Under the assumption that WAN UL signal transmission in the SF #(P+1) of the Cell # B partially overlaps with a pre-defined (or signaled) WAN UL signal transmitted in the SF #(Q+1) of the Cell # A (according to an allocated-resource count/position/modulation related to D2D signal transmission), a rule may be defined such that TX power for a D2D signal in the SF # Q of the Cell # A and TX power of a D2D signal in the SF #(Q+1) of the Cell # A are determined on the basis of calculated $P_{CMAX}$((P+1), (Q+1)) related to D2D signal transmission in the SF #(Q+1) of the Cell # A ("PCMAX_DW((P+1), (Q+1))") (or $P_{CMAX\_L}$((P+1), (Q+1)) ("PCMAXL_DW((P+1), (Q+1))")) or $P_{CMAX,A}$((P+1), (Q+1)). Herein, for example, in this rule, WAN UL signal transmission (in the SF #(P+1) of the Cell # B) may be interpreted as a reference for calculating D2D signal TX power (in the SF #(Q+1) of the Cell # A) (e.g., PCMAX_DW((P+1), (Q+1)) (or PCMAXL_DW((P+1), (Q+1)))).

For example, $P_{CMAX,A}$(P, Q) and $P_{CMAX,A}$(Q, (P+1)) may have the same value.

For example, if TX power of a D2D signal at an SF # Q of a Cell # A, which is determined by an open-loop power control parameter, is assumed as "D2D_CONP(Q)", TX power of a final D2D signal at a corresponding time ("D2D_TXP(Q)") may be determined as MIN {(NEW_VAL−MAX_WANVAL), MIN {PCMAX,A(Q, Q), D2D_CONP(Q)}}. Herein, for example, NEW_VAL may be determined as MIN {PCMAXL_DW(P, Q), PCMAX- L_DW(Q, (P+1))} (or MAX {PCMAXL_DW(P, Q), PCMAXL_DW(Q, (P+1))} or MIN {PCMAX_DW(P, Q), PCMAX_DW(Q, (P+1))} or MAX {PCMAX_DW(P, Q), PCMAXL_DW(Q, (P+1))} or PCMAXL_DW(P, Q) or PCMAX_DW(P, Q) or PCMAXL_DW(Q, (P+1)) or PCMAX_DW(Q, (P+1))). Further, for example, MAX_WANVAL may be determined as MAX {WAN_TXP(P), WAN_TXP(P+1)}. Furthermore, for example, NEW_VAL related to determining of D2D_TXP(Q) may be replaced with $P_{PowerClass}$ or MIN {$P_{EMAX,A}$, $P_{PowerClass}$}.

For example, if TX power of a D2D signal at the SF # Q of the Cell # A, which is determined by an open-loop power control parameter, is assumed as "D2D_CONP(Q+1)", TX power of a final D2D signal at a corresponding time ("D2D_TXP(Q+1)") may be determined as MIN {(NEW_VAL−MAX_WANVAL), MIN {PCMAX,A((Q+1), (Q+1)), D2D_CONP(Q+1)}}. Herein, for example, NEW_VAL may be determined as MIN {PCMAXL_WO (P+1), PCMAXL_DW((P+1), (Q+1))} (or MAX {PCMAX-L_WO(P+1), PCMAXL_DW((P+1), (Q+1))} or MIN {PCMAX_WO(P+1), PCMAX_DW((P+1), (Q+1))} or MAX {PCMAX_WO(P+1), PCMAX_DW((P+1), (Q+1))} or PCMAXL_WO(P+1) or PCMAXL_DW((P+1), (Q+1)) or PCMAX_WO(P+1) or PCMAX_DW((P+1), (Q+1))). Further, for example, MAX_WANVAL may be determined as WAN_TXP(P+1).

Furthermore, for example, NEW_VAL related to determining of D2D_TXP(Q+1) may be replaced with $P_{PowerClass}$ or MIN {$P_{EMAX,A}$, $P_{PowerClass}$}.

For another example, if TX power of a D2D signal at the SF # Q of the Cell # A, which is determined by an open-loop power control parameter, is assumed as "D2D_CONP(Q)", TX power of a final D2D signal at a corresponding time ("D2D_TXP(Q)") may be determined as MIN {(NEW_VAL−MAX_WANVAL), MIN {PCMAX,A(Q, Q), D2D_CONP(Q)}}. Herein, for example, NEW_VAL may be determined as MIN {PCMAXL_DW(P, Q), MIN {PCMAXL_DW(Q, (P+1)), PCMAXL_DW((P+1), (Q+1))} }(or MAX {PCMAXL_DW(P, Q), MIN {PCMAX-L_DW(Q, (P+1)), PCMAXL_DW((P+1), (Q+1))}} or MIN {PCMAX_DW(P, Q), MIN {PCMAX_DW(Q, (P+1)), PCMAX_DW((P+1), (Q+1))}} or MAX {PCMAX_DW(P, Q), MIN {PCMAX_DW(Q, (P+1)), PCMAX_DW((P+1), (Q+1))}} or PCMAXL_DW(P, Q) or MIN {PCMAXL_DW (Q, (P+1)), PCMAXL_DW((P+1), (Q+1))} or PCMAX_DW(P, Q) or MIN {PCMAX_DW(Q, (P+1)), PCMAX_DW((P+1), (Q+1))}. Further, for example, MAX_WANVAL may be determined as MAX {WAN_TXP(P), WAN_TXP(P+1)}. Furthermore, for example, NEW_VAL related to determining of D2D_TXP(Q) may be replaced with $P_{PowerClass}$ or MIN {$P_{EMAX,A}$, $P_{PowerClass}$}.

For another example, if TX power of a D2D signal at the SF # Q of the Cell # A, which is determined by an open-loop power control parameter, is assumed as "D2D_CONP(Q+1)", TX power of a final D2D signal at a corresponding time("D2D_TXP(Q+1)") may be determined as MIN {(NEW_VAL−MAX_WANVAL), MIN {$P_{CMAX,A}$((Q+1), (Q+1)), D2D_CONP(Q+1)}}. Herein, for example, NEW_VAL may be determined as MIN {MIN {PCMAX-L_WO(P+1), PCMAXL_DW(Q, (P+1))}, PCMAXL_DW ((P+1), (Q+1))} (or MAX {MIN {PCMAXL_WO(P+1), PCMAXL_DW(Q, (P+1))}, PCMAXL_DW((P+1), (Q+1))} or MIN {MIN {PCMAX_WO(P+1), PCMAX_DW (Q, (P+1))}, PCMAX_DW((P+1), (Q+1))} or MAX {MIN {PCMAX_WO(P+1), PCMAX_DW(Q, (P+1))}, PCMAX_DW((P+1), (Q+1))} or MIN {PCMAXL_WO(P+1), PCMAXL_DW(Q, (P+1))} or PCMAXL_DW((P+1), (Q+1)) or MIN {PCMAX_WO(P+1), PCMAX_DW(Q, (P+1))} or PCMAX_DW((P+1), (Q+1)). Further, for example, MAX_WANVAL may be determined as WAN_TXP(P+1). Furthermore, for example, NEW_VAL related to determining of D2D_TXP(Q+1) may be replaced with $P_{PowerClass}$ or MIN {$P_{EMAX,A}$, $P_{PowerClass}$}.

For example, if D2D_TXP(Q) and D2D_TXP(Q+1) cannot satisfy an emission requirement pre-defined (or signaled) in a simultaneous transmission situation of a WAN UL signal/D2D signal, a rule may be defined such that D2D_TXP(Q) and D2D_TXP(Q+1) are preferentially decreased until the emission requirement is satisfied. For another example, in order to solve such a problem, a rule may be defined such that a pre-defined (or signaled) power offset value is additionally applied to (final) D2D_TXT(Q) and/or D2D_TXP(Q+1). For another example, if D2D_TXP(Q) and D2D_TXP(Q+1) cannot satisfy the pre-defined (or signaled) emission requirement in the simultaneous transmission situation of the WAN UL signal/D2D signal, a rule may be defined such that transmission of the D2D signal is omitted.

Figure 17:
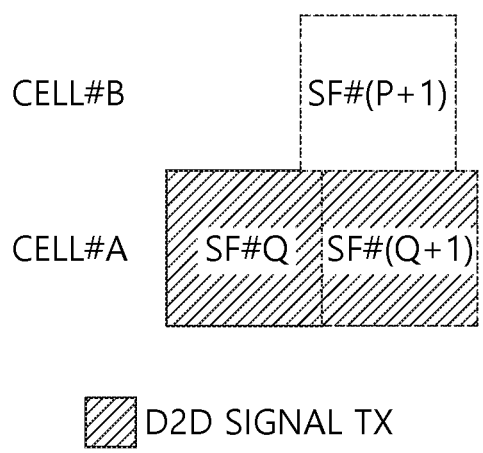
FIG. 17 shows timing of D2D signal transmission and WAN UL signal transmission.

FIG. 17 shows timing of D2D signal transmission and WAN UL signal transmission.

Referring to FIG. 17, an SF # Q+1 of a Cell # A and an SF # P+1 of a Cell # B are not aligned temporally. In this situation, D2D signal transmission is performed in an SF # Q and SF # Q+1 of the Cell # A, and WAN UL signal transmission is performed in the SF # P+1 of the Cell # B.

Example #5-8

In 'CASE (2)' or timing as shown in FIG. 17, for example, if D2D signal transmission, D2D signal transmission, and WAL UL signal transmission must be sequentially performed on the SF # Q of the Cell # A, the SF #(Q+1) of the Cell # A, and the SF3(P+1) of the Cell # B, it may be defined such that TX power of a D2D signal in the SF # Q of the Cell # A and TX power of a D2D signal in the SF #(Q+1) of the Cell # A are determined according to the following rule.

Herein, for example, (Example #5-8) may be interpreted as a case where a WAN UL cell (carrier) leads a D2D cell (carrier). Further, for example, in FIG. 17, an SF index 'Q (//(Q+1))' of the Cell # A may be assumed as 'K (//(K+1))', and an SF index '(P+1)' of the Cell # B may be assumed as '(K+1)'.

At a (partially or entirely) overlapping time (subframe) on other cells, the TX power of the D2D signal in the SF # Q of the Cell # A and the TX power of the D2D signal in the SF #(Q+1) of the Cell # A may be determined on the basis of $P_{CMAX}$(P+1)("PCMAX_WO(P+1)") (or $P_{CMAX\_L}$(P+1) ("PCMAXL_WO(P+1)")) or $P_{CMAX,B}$(P+1) related to WAN UL signal transmission in the SF #(P+1) of the Cell # B, calculated under the assumption that there is no D2D signal transmission.

For example, if the TX power of the WAN UL signal in the SF #(P+1) of the Cell # B determined by the open-loop power control/closed-loop power control parameter is assumed as "WAN_CONP(P+1)", the final TX power of the WAN UL signal in the SF #(P+1) of the Cell # B ("WAN_TXP(P+1)") may be determined as MIN {PCMAX_ WO(P+1), MIN {$P_{CMAX,B}$(P+1), WAN_CONP (P+1)}}.

Under the assumption that WAN UL signal transmission in the SF #(P+1) of the Cell # B partially overlaps with a pre-defined (or signaled) WAN UL signal transmitted in the SF # Q of the Cell # A (according to an allocated-resource count/position/modulation related to D2D signal transmission), TX power for a D2D signal in the SF # Q of the Cell # A and TX power of a D2D signal in the SF #(Q+1) of the Cell # A may be determined on the basis of calculated $P_{CMAX}$(Q, (P+1)) related to D2D signal transmission in the SF # Q of the Cell # A ("PCMAX_DW(Q, (P+1))") (or $P_{CMAX\_L}$(Q, (P+1)) ("PCMAXL_DW(Q, (P+1))")) or $P_{CMAX,A}$(Q, (P+1)). In this rule, WAN UL signal transmission (in the SF #(P+1) of the Cell # B) may be interpreted as a reference for calculating D2D signal TX power (in the SF # Q of the Cell # A) (e.g., PCMAX_DW(Q, (P+1)) (or PCMAXL_DW(Q, (P+1)))).

Under the assumption that WAN UL signal transmission in the SF #(P+1) of the Cell # B partially overlaps with a pre-defined (or signaled) WAN UL signal transmitted in the SF #(Q+1) of the Cell # A according to an allocated-resource count/position/modulation related to D2D signal transmission, TX power for a D2D signal in the SF # Q of the Cell # A and TX power of a D2D signal in the SF #(Q+1) of the Cell # A may be determined on the basis of calculated $P_{CMAX}$((P+1), (Q+1)) related to D2D signal transmission (in the SF #(Q+1) of the Cell # A) ("PCMAX_DW((P+1), (Q+1))") (or $P_{CMAX\_L}$((P+1), (Q+1)) ("PCMAXL_DW((P+1), (Q+1))")) or $P_{CMAX,A}$((P+1), (Q+1)). Herein, for example, in this rule, WAN UL signal transmission (in the SF #(P+1) of the Cell # B) may be interpreted as a reference for calculating D2D signal TX power (in the SF #(Q+1) of the Cell # A) (e.g., PCMAX_DW((P+1), (Q+1)) (or PCMAXL_DW((P+1), (Q+1)))).

For example, if TX power of a D2D signal in the SF # Q of the Cell # A determined by an open-loop power control parameter is assumed as "D2D_CONP(Q)", TX power of a final D2D signal at a corresponding time("D2D_TXP(Q)") may be determined as MIN {(NEW_VAL−MAX_WANVAL), MIN {$P_{CMAX,A}$(Q, (P+1)), D2D_CONP(Q)}}. Herein, for example, NEW_VAL may be determined as MIN {PCMAXL_WO(P+1), PCMAXL_DW(Q, (P+1))} (or MAX {PCMAXL_WO(P+1), PCMAXL_DW(Q, (P+1))} or MIN {PCMAX_WO(P+1), PCMAX_DW(Q, (P+1))} or MAX {PCMAX_WO(P+1), PCMAX_DW(Q, (P+1))} or PCMAXL_WO(P+1) or PCMAXL_DW(Q, (P+1)) or PCMAX_WO(P+1) or PCMAX_DW(Q, (P+1)). Further, for example, MAX_WANVAL may be determined as WAN_TXP(P+1). Furthermore, for example, NEW_VAL related to determining of D2D_TXP(Q) may be replaced with $P_{PowerClass}$ or MIN {$P_{EMAX,A}$, $P_{PowerClass}$}.

For example, if TX power of a D2D signal in the SF #(Q+1) of the Cell # A determined by an open-loop power control parameter is assumed as "D2D_CONP (Q+1)", TX power of a final D2D signal at a corresponding time("D2D_TXP(Q+1)") may be determined as MIN {(NEW_VAL−MAX_WANVAL), MIN {$P_{CMAX,A}$((P+1), (Q+1)), D2D_CONP(Q+1)}}. Herein, for example, NEW_VAL may be determined as MIN {PCMAXL_WO (P+1), PCMAXL_DW((P+1), (Q+1))} (or MAX {PCMAXL_WO(P+1), PCMAXL_DW((P+1), (Q+1))} or MIN {PCMAX_WO(P+1), PCMAX_DW((P+1), (Q+1))} or MAX {PCMAX_WO(P+1), PCMAX_DW((P+1), (Q+1))} or PCMAXL_WO(P+1) or PCMAXL_DW((P+1), (Q+1)) or PCMAX_WO(P+1) or PCMAX_DW((P+1), (Q+1))). Further, for example, MAX_WANVAL may be determined as WAN_TXP(P+1).

Furthermore, for example, NEW_VAL related to determining of D2D_TXP(Q+1) may be replaced with $P_{PowerClass}$ or MIN {$P_{EMAX,A}$, $P_{PowerClass}$}.

For example, if D2D_TXP(Q) and D2D_TXP(Q+1) cannot satisfy an emission requirement pre-defined (or signaled) in a simultaneous transmission situation of a WAN UL signal/D2D signal, a rule may be defined such that D2D_TXP(Q) and D2D_TXP(Q+1) are preferentially decreased until the emission requirement is satisfied. For another example, in order to solve such a problem, a rule may be defined such that a pre-defined (or signaled) power offset value is additionally applied to (final) D2D_TXT(Q) and/or D2D_TXP(Q+1). For another example, if D2D_TXP(Q) and D2D_TXP(Q+1) cannot satisfy the pre-defined (or signaled) emission requirement in the simultaneous transmission situation of the WAN UL signal/D2D signal, a rule may be defined such that transmission of the D2D signal is omitted.

For example, by applying some or all of methods described below, a rule may be defined such that TX power of a D2D signal is derived/determined.

The following rules may be limitedly applied only to a UE which is capable of both discovery and D2D communication, or a UE which simultaneously performs discovery signal transmission and D2D communication transmission or to which both of the discovery and the D2D communication are configured via higher layer signaling, or a UE which is capable of only the discovery (a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling).

Further, for example, in the following rules, TX power of a PSSS (and/or PSBCH) (related to discovery and/or D2D communication) transmitted by a UE which is capable of both discovery and D2D communication (or a UE which simultaneously performs discovery signal transmission and D2D communication transmission or to which both of the discovery and the D2D communication are configured via higher layer signaling) or a UE which is capable of only the discovery (or a UE which performs only the discovery transmission or to which only the discovery is configured via the higher layer signaling), or a UE which is capable of only the D2D communication (or a UE which performs only the D2D communication transmission or to which only the D2D communication is configured via the higher layer signaling) may calculate a value $P_{CMAX,C}(N)$ (and/or $P_{CMAX}(N)$) used when determining the TX power of the PSSS (and/or PSBCH) (related to discovery and/or D2D communication) by substituting MIN {a maximum D2D communication TX power value, a maximum discovery TX power value} (or MAX {a maximum D2D communication TX power value, a maximum discovery TX power value} or a maximum D2D communication TX power value or a maximum discovery TX power value) to a parameter $P_{EMAX,C}$ according to: 1) whether there is an SIB 19 and/or an SIB 18; and 2) whether there is 'syncConfig' of D2D communication and/or 'syncConfig' of discovery (or whether decoding is possible).

Hereinafter, it is described a method for preventing D2D TX power from having an effect on TX power of WAN UL transmission when WAN UL transmission and D2D transmission (sidelink transmission) are performed in different carriers.

At present, transmit power of a sidelink channel and a sidelink signal is determined to a smaller value between an output value based on an open-loop power control and a maximum power value. For example, transmit power for a PSSCH according to a mode 2 may be determined by the following equation.

$$P_{PSSCH} = \min\{P_{CMAX,PSSCH}, 10 \log_{10}(M_{PSSCH}) + P_{O\_SSCH,1} + \alpha_{PSSCH,2} \cdot PL\} \text{ [dBm]}$$

[Equation 26]

In the above equation, $P_{CMAX,PSSCH}$ is a value $P_{CMAX,c}$ determined by a UE as to a UL subframe corresponding to a sidelink subframe in which a PSSCH is transmitted. $M_{PSSCH}$ is a band of PSSCH resource allocation expressed by the number of resource blocks, and PL denotes a path loss value.

Herein, $P_{CMAX,c}$ is determined using various parameters, and one of the parameters is $P_{EMAX}$. $P_{EMAX}$ is a value given by P-Max which is an information element defined in an SIB 1.

Meanwhile, there is an ongoing discussion on parameters for configuring maximum power for D2D transmission. Examples of the parameter may include 'discMaxTxPower', 'maxTxPower', or the like. The 'discMaxTxPower' may be included in an information element (IE) called 'ProseDiscTxPowerInfo' for discovery, and the 'maxTxPower' may be included in an IE called 'ProsePreconfiguration' for D2D communication outside cell coverage.

To complete a process of determining sidelink TX power by the UE, there is a need to define $P_{CMAX,c}$ for each sidelink channel/signal.

In one method for this, $P_{EMAX}$ which is a configurable parameter is given as a parameter value related to corresponding sidelink transmission.

As described above, when calculating $P_{CMAX,c}$ for PSDCH, a value indicated by 'discMaxTxPower' is set to a value $P_{EMAX}$. Further, when calculating $P_{CMAX,c}$ for PSCCH and PSSCH outside cell coverage, a value indicated by 'maxTxPower' is set to the value $P_{EMAX}$. In this state, there is no configuration for D2D communication inside the cell coverage, and P-Max which is an existing parameter is re-used.

Meanwhile, how to determine maximum power of SLSS and PSBCH is a matter to be considered. Since there is no particular parameter to be configured for this usage, it may be required to re-use parameters used in other sidelink channels.

Herein, parameters used in a sidelink channel which triggers SLSS/PSBCH transmission and a parameter for the SLSS/PSBCH transmission may be preferably used in the same manner. This is because coverage of SLSS/PSBCH may be similar to coverage of the sidelink channel which triggers the SLSS/PSBCH.

If not using the same parameter, the SLSS/PSBCH and the sidelink channel which triggers this may have different coverage. For example, if the SLSS/PSBCH always uses P-Max included in an SIB1, the coverage of the SLSS may be a bottleneck of discovery when a network supporting only the discovery desires to restrict maximum power of PUSCH by considering inter-cell interference.

Meanwhile, when a UE inside cell coverage transmits both of D2D communication and discovery, SLSS/PSBCH transmission in a subframe may be simultaneously triggered by the D2D communication and the discovery. In this case, the following two methods may be considered.

1. A first method is for taking a maximum value between 'discMaxTxPower' and 'P-Max'. This method has an advantage in that SLSS/PSBCH can cover both of D2D discovery and D2D communication. However, this method has a problem in that S-RSRP is changed since a maximum power parameter for PSBCH can be changed in a discovery resource pool-related SLSS subframe in which a specific UE transmits a discovery signal.

In the following discussion, it is assumed that an SLSS triggering condition is changed in unit of subframes. For example, SLSS transmission may be triggered by both of D2D communication and discovery in a 1st SF, and SLSS transmission may be triggered only by the D2D communication in a 2nd SF. For example, a subframe which is a 1st SF of a resource pool for discovery signal transmission and which is included in a physical sidelink control channel (PSCCH) for D2D communication transmission may be the 1st SF. Further, SLSS may be triggered after 40 ms (for only the D2D communication) by only the D2D communication, and a subframe in this case may be the 2nd SF.

2. A second method is for taking a value P-Max. According to this method, there is an advantage in that an S-RSRP change can be avoided.

3. A third method is for taking a value 'discMaxTx-Power'.

To solve a problem in which a coverage difference occurs between the PSDCH and the SLSS/PSBCH, a network may increase the value P-Max by considering coverage of D2D communication and maximum power of PUSCH, thereby solving the problem.

If maximum power of sidelink transmission is denoted by $P_{CMAX,c}$, it may be obtained by configuring $P_{EMAX}$ as follows.

TABLE 5

| Maximum power | Condition | Value set to $P_{EMAX}$ |
|---|---|---|
| $P_{CMAX, PSSCH}$ | Out-coverage | maxTxPower in ProsePreconfiguration IE |
| $P_{CMAX, PSCCH}$ | In-coverage | P-Max in SIB1 |
| $P_{CMAX, PSDCH}$ | In-coverage | discMaxTxPower in ProseDiscTxPowerInfo IE |
| $P_{CMAX, PSSS}$ | Out-coverage | maxTxPower in ProsePreconfiguration IE |
| | In-coverage and triggered for communication | P-Max in SIB1 |
| | Otherwise | discMaxTxPower in ProseDiscTxPowerInfo IE |

Herein, being triggered for D2D communication implies that SLSS/PSBCH transmission in a specific subframe is triggered for the following cases.

1) When a UE is capable of performing D2D communication and a base station instructs SLSS/PSBCH transmission to the UE via a dedicated signal, and 2) when RSRP for a serving cell is lower than a threshold configured for SLSS/PSBCH transmission, and PSCCH or PSSCH is transmitted in a PSCCH period included in subframes for SLSS/PSBCH transmission.

Meanwhile, if power is restricted when operating multiple carriers, D2D TX power in a sidelink subframe may be decreased to a specific power level so as not to have an effect on WAN UL TX power. The UE may decrease D2D TX power when a result of summing calculated TX power of each channel exceeds supportable maximum power.

It is considered a case where D2D transmission occurs only in one carrier.

Hereinafter, $\hat{P}_{UL}(i)$ is a sum of UL TX power in a UL subframe i in carriers other than a carrier c. The sum of UL TX power may be obtained under the control of the existing WAL UL power. This is calculated without consideration of sidelink transmission in the carrier c.

Herein, for example, among the remaining carriers (in which WAN UL transmission is performed) other than a Carrier # C (i.e., a carrier in which sidelink transmission is performed), if PUSCH transmission (i.e., performed with TX power of P_PUSCH) and SRS transmission (i.e., performed with TX power of P_SRS) are simultaneously performed (or configured) on a subframe i of a specific Carrier # X, when calculating $\hat{P}_{UL}(i)$, a rule may be defined such that WAN UL TX power in the subframe i of the Carrier # X is regarded (or assumed) as a maximum value (or minimum value) between P_PUSCH and P_SRS.

For another example, among the remaining carriers (in which WAN UL transmission is performed) other than a Carrier # C (i.e., a carrier in which sidelink transmission is performed), if PUCCH transmission (i.e., performed with TX power of P_PUCCH) and SRS transmission (i.e., performed with TX power of P_SRS) are simultaneously performed (or configured) on a subframe i of a specific Carrier # Y, when calculating $\hat{P}_{UL}(i)$, a rule may be defined such that WAN UL TX power in the subframe i of the Carrier # Y is regarded (or assumed) as a maximum value (or minimum value) between P_PUCCH and P_SRS.

Herein, for example, simultaneous transmission of PUCCH and SRS on the subframe i of the Carrier # Y may be interpreted as a case where simultaneous transmission of HARQ-ACK and SRS is configured (in the Carrier # Y) (or a case where a shortened PUCCH format is configured).

$\hat{P}_{SL,c}(k)$ is a resultant value of a sidelink TX power control for a subframe k in a carrier c under the assumption that there is no UL transmission temporally overlapping in the remaining carriers other than the carrier c.

$\hat{P}_{SL,c}(k,i)$ denotes power which can be used in sidelink transmission in a subframe k of a carrier c. It is premised herein that a UL subframe i of another carrier temporally overlaps with the subframe k.

Figure 18:
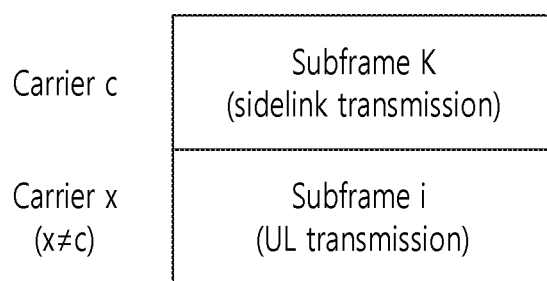
FIG. 18 shows that a subframe k of a carrier c overlaps with a subframe i of a carrier x.

FIG. 18 shows that a subframe k of a carrier c overlaps with a subframe i of a carrier x.

Referring to FIG. 18, the subframe k and the subframe i of different carriers, i.e., the carrier c and the carrier x, temporally overlap with each other. Sidelink transmission, i.e., signal transmission based on a D2D operation, is performed in the subframe k, and WAN UL transmission is performed in the subframe i.

In a situation of FIG. 18, if $(\hat{P}_{UL}(i)+\hat{P}_{SL,c}(k))$ is less than $\hat{P}_{CMAX}(k,i)$ which is maximum power that can be supported by the UE, transmission in each carrier does not have an effect on each other, and additional power reduction is unnecessary. Herein, $\hat{P}_{CMAX}(k,i)$ must be calculated by considering that WAN UL transmission and sidelink transmission are performed simultaneously. In this case, it is premised that a parameter such as a band combination/modulation/resource or the like of the sidelink transmission is the same as those of PUSCH transmission.

If $(\hat{P}_{UL}(i)+\hat{P}_{SL,c}(k))$ is greater than $\hat{P}_{CMAX}(k,i)$, sidelink TX power must be reduced as shown in the following equation.

$$\hat{P}_{SL,c}(k,i)=w(k,i)\times\hat{P}_{SL,c}(k)\le(\hat{P}_{CMAX}(k,i)-\hat{P}_{UL}(i)) \quad \text{[Equation 27]}$$

In the above equation, w(k,i) is a scaling factor, and may be selected from values in the range of 0 to 1.

Figure 19:
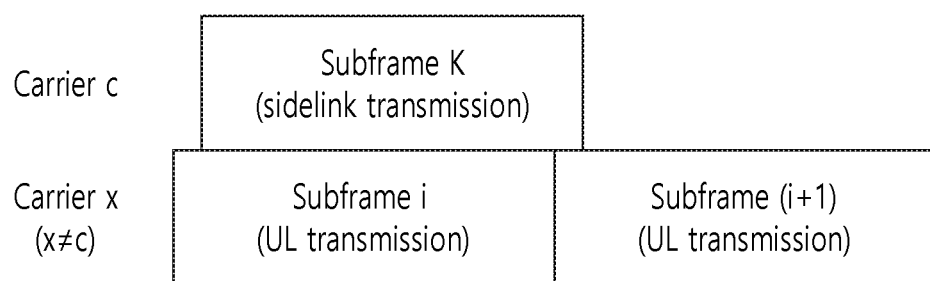
FIG. 19 shows an example of a case where a sidelink subframe overlaps with a plurality of UL subframes.

FIG. 19 shows an example of a case where a sidelink subframe overlaps with a plurality of UL subframes.

Referring to FIG. 19, a subframe k of a carrier c partially overlaps temporally with subframes i and i+1 of a carrier x. Sidelink transmission is performed in the subframe k, and WAN UL transmission is performed in subframes i and i+1.

In this case, in order to implement constant sidelink TX power, the UE calculates $\hat{P}_{SL,c}(k,i)$ for all UL subframes (i.e., subframes i and i+1) overlapping with a sidelink subframe k, and takes a smallest one among them. That is, final sidelink TX power is given by the following equation.

$$\min\{\hat{P}_{SL,c}(k,i),\hat{P}_{SL,c}(k,(i+1))\} \quad \text{[Equation 28]}$$

Now, a method of determining TX power is described in a case where sidelink transmission (transmission based on a D2D operation) and WAN UL transmission overlap with each other temporally in different carriers as shown in FIGS. 18 and 19.

Figure 20:
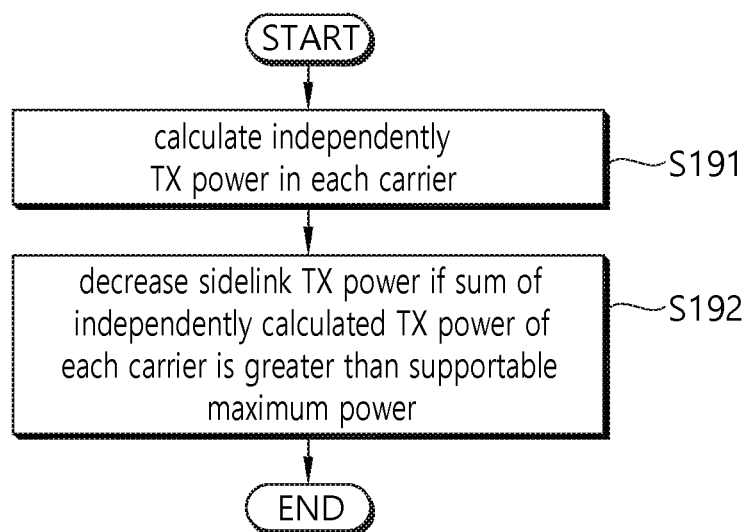
FIG. 20 shows a method of determining UL TX power according to an embodiment of the present invention.

FIG. 20 shows a method of determining UL TX power according to an embodiment of the present invention.

Referring to FIG. 20, a UE independently calculates TX power in each carrier (S191). For example, TX power is calculated for a carrier C performing sidelink transmission, and TX power is calculated for a carrier X performing WAN UL transmission.

If a sum of the independently calculated TX power of each carrier is greater than supportable maximum power, the UE decreases sidelink TX power (S192). Herein, sidelink transmission may be treated similarly to WAN UL transmission in another carrier (for example, it is assumed that parameters related to the sidelink transmission is applied to WAN UL transmission) to calculate the supportable maximum power (for example, it may be regarded (/interpreted) identically to the existing situation in which WAN UL transmissions occur simultaneously on the carrier C and the carrier X). In other words, the supportable maximum power is calculated by regarding sidelink transmission as WAN UL transmission. It is assumed in this case that the same parameters as the sidelink transmission are used in the WAN UL transmission.

For example, if TX power for WAN transmission performed in a $1^{st}$ carrier is denoted as $1^{st}$ TX power and TX power for transmission based on a D2D operation performed in a $2^{nd}$ carrier is denoted by $2^{nd}$ TX power, the $1^{st}$ and $2^{nd}$ TX powers are calculated independently, and if a sum of the $1^{st}$ TX power and the $2^{nd}$ TX power is greater than the supportable maximum power of the UE, the $2^{nd}$ TX power is decreased.

In this case, the WAN transmission and the transmission based on the D2D operation are simultaneously performed, and the $1^{st}$ carrier and the $2^{nd}$ carrier are carriers of different frequencies.

Further, the supportable maximum power of the UE may be calculated by treating the transmission based on the D2D operation similarly to the WAN transmission (for example, it may be regarded (/interpreted) identically to the existing situation in which WAN UL transmissions occur simultaneously in a $1^{st}$ carrier and a $2^{nd}$ carrier).

For example, $2^{nd}$ TX power is calculated under the assumption that parameters related to sidelink transmission may be equally applied to WAN UL transmission, and thereafter the supportable maximum power of the UE may be calculated on the basis of (or by using) the $2^{nd}$ TX power and 1st TX power.

That is, according to the method of FIG. 20, TX power allocated to sidelink transmission cannot be greater than power which remains in supportable maximum power after allocating power first to WAN UL transmission. According to this method, for example, allocating of sidelink transmit power does not have an effect on WAN UL transmission.

Hereinafter, a cell selection and cell reselection operation (on a non-serving carrier/frequency) for D2D communication (in a non-serving carrier/frequency) and/or a cross-pool configuration operation are described under a situation of intra-PLMN/inter-PLMN.

A requirement described below may be applied to a UE in an RRC_IDLE state and an RRC_CONNECTED state. When the UE intends to perform D2D communication at a non-serving frequency, a measurement is performed for the non-serving frequency for the purpose of a cell selection and an intra-frequency reselection. If the UE detects at least one cell which satisfies an S-criterion at the frequency configured to perform the D2D communication, it is regarded that the UE is inside cell coverage at the frequency in regards to the D2D communication. If the UE cannot detect any cell satisfying the S-criterion at the frequency, it is regarded that the UE is outside the cell coverage in regards to the D2D communication.

Upon selecting a cell in the non-serving frequency for the D2D communication, the UE may perform an intra-frequency reselection process for selecting a better cell for the D2D communication at the frequency. In this case, the reselection process may be performed according to reselection related parameters which are broadcast in the cell selected for the D2D communication.

It may be regarded that a carrier predetermined for D2D communication has a highest cell reselection priority.

If a frequency configured for D2D communication is a serving frequency, the UE uses a serving cell of the frequency for the D2D communication.

In an intra PLMN case, it may be allowed to configure that a discovery signal is transmitted in other carriers via an RRC signal. The RRC signal may be used for a type 1 or type 2 discovery configuration for a frequency other than a primary frequency.

In an inter-PLMN case, there is a need for an SA2 guideline for whether an inter-PLMN authentication for discovery signal transmission is controlled by a higher layer.

If a network has inter-PLMN information, the network may configure a UE similarly to the intra-PLMN case. An inter-PLMN coordination is not always possible. In case of non-coordinated inter-PLMN, the UE may read an SIB19 of a corresponding frequency to know a transmission/reception resource in use.

When there is no base station at a frequency at which a D2D operation is performed, a D2D discovery operation may be supported outside cell coverage.

Hereinafter, a frequency/carrier (referred to as non-primary frequency/carrier) other than a primary frequency of a UE which transmits a specific D2D signal (and/or a non-serving carrier/frequency) is denoted by "NP_FRQ". It is proposed a method of effectively configuring D2D TX power when performing an operation of transmitting a D2D channel/signal on the "NP_FRQ".

Herein, a primary carrier/frequency (and/or a serving carrier/frequency) of a UE which transmits a D2D signal is denoted by "PR_FRQ". NP_FRQ may have an inter-PLMN (or intra-PLMN) and/or inter-frequency (or intra-frequency) (and/or an adjacent frequency (or the same frequency)) relation with the PR_FRQ.

[Proposed method #6] Estimating of a path loss (PL) related to a non-serving cell on NP_FRQ may be inaccurate in comparison with estimating of a PL related to a serving cell on PR_FRQ in various reasons. (1) This is because the number of measurement samples related to the non-serving cell on NP_FRQ which can be acquired within a specific time period may be relatively smaller than the number of measurement samples related to the serving cell on PR_FRQ. Herein, for example, in case of D2D signal transmission of a UE which moves fast, even NP_FRQ non-serving cell related measurement samples which are acquired in a relatively less amount may be inaccurate. Therefore, a greater amount of time (and measurement sample) may be required to satisfy a pre-defined (or signaled) measurement requirement. (2) Further, this is because estimating of a PL for determining power related to a D2D channel/signal transmission operation in NP_FRQ may be defined as a pre-defined (or signaled) different cell (on a carrier/frequency) other than the NP_FRQ non-serving cell.

For example, the inaccurate estimating of the PL related to the NP_FRQ non-serving cell results in inaccurate determining of D2D channel/signal TX power on NP_FRQ, and this may result in undesired interference on WAN (UL/(/DL)) communication (and/of D2D communication) of a non-serving cell (and/or a serving cell (e.g., when NP_FRQ and PR_FRQ have an adjacent frequency relation)) (e.g., when NP_FRQ D2D TX power is set to be excessively high), or may result in a deterioration of D2D channel/signal transmission performance on NP_FRQ (e.g., when the NP_FRQ D2D TX power is set to be excessively low).

In order to reduce such a problem, it may be configured such that a UE which performs an operation of transmitting an NP_FRQ D2D channel/signal is allowed to conform to the following (some or all of) rules.

Herein, a power control parameter related to D2D channel/signal transmission may be interpreted as an open-loop/closed-loop power control parameter and/or maximum (allowed) D2D TX power.

(Rule #6-1) When a power control parameter related to NP_FRQ D2D channel/signal transmission (i.e., named as "NPPCPARA_SV") is signaled (or configured) by a serving cell on PR_FRQ, a UE which transmits a D2D signal may determine NP_FRQ D2D channel/signal TX power on the basis of the NPPCPARA_SV by ignoring a power control parameter (i.e., named as "NPPCPARA_NS") (related to NP_FRQ D2D channel/signal transmission) acquired (through pre-defined signal reception (e.g., SIB)) from the NP_FRQ non-serving cell.

Herein, for example, if NPPCPARA_SV is not signaled (or configured) by a serving cell on PR_FRQ, the UE is allowed to determine NP_FRQ D2D channel/signal TX power on the basis of the NPPCPARA_NS (acquired (through pre-defined signal reception) from an NP_FRQ non-serving cell).

A channel (e.g., SIB) for announcing PR_FRQ related D2D channel/signal resource pool information and/or D2D channel/signal TX power information (or D2D channel/signal resource pool information and/or D2D channel/signal TX power information on a carrier (or frequency) having an intra-frequency (or intra-PLMN) with PR_FRQ) and a channel (e.g., SIB) for announcing NP_FRQ related D2D channel/signal resource pool information and/or D2D channel/signal TX power information (or D2D channel/signal resource pool information and/or D2D channel/signal TX power information on a carrier (or frequency) having an inter-frequency (or inter-PLMN) relation with PR_FRQ) may be independently (or differently) defined.

(Rule #6-2) Two (usages of) power control parameters are signaled by an NP_FRQ non-serving cell via a pre-defined channel (/signal) (e.g., SIB). One (i.e., named as "SV_PARA") may be used by a UE which measures a path loss by using it as a serving cell (or intra-frequency), and the other (i.e., named as "NS_PARA") may be used by a UE which measures a path by using it as a non-serving cell (or inter-frequency).

Herein, for another example, SV_PARA and a (power control parameter) offset (i.e., a UE which measures a path loss by using it as a non-serving cell (or inter-frequency) determines final NP_FRQ D2D TX power by applying a corresponding (power control parameter) offset to the SV_PARA) may be signaled (or a UE which measures a path loss by using it as a serving cell (or intra-frequency) determines final NP_FRQ D2D TX power by applying a corresponding (power control parameter) offset to the NS_PARA) may be signaled) by an NP_FRQ non-serving cell via a pre-defined channel (/signal) (e.g., SIB).

For another example, a serving cell on PR_FRQ (or a non-serving cell on NP_FRQ) may be configured (through pre-defined signaling) to apply relatively small TX power (and/or D2D transmission possibility) to a UE which has a relation thereto (or which exists inside its coverage) when performing D2D channel/signal transmission on an inter-PLMN carrier (frequency) (or inter-frequency). This may be interpreted as a sort of penalty.

Further, for example, a serving cell on PR_FRQ (or a non-serving cell on NP_FRQ) may be configured to apply relatively small TX power (and/or D2D TX probability) (through pre-defined signaling) when a UE which has a connection with an inter-PLMN (or inter-frequency) cell (or inter-PLMN (or inter-frequency) cell (or which exists inside coverage of an inter-PLMN (or inter-frequency cell)) intends to perform its (inter-PLMN) carrier/frequency (or on an intra-frequency/carrier). This may be interpreted as a sort of penalty.

Hereinafter, a PSDCH transmission and PSDCH related SLSS transmission method will be described in case of partially being included in cell coverage or of being outside the cell coverage.

Assume that a UE operating based on LTE-A Rel-13 is an Rel-13 UE. The Rel-13 UE transmits a type-1 discovery signal according to any one of the following two operations (i.e., an operation 1, an operation 2) when SLSS is transmitted.

Operation 1: In the same operation as Rel-12, the UE transmits the SLSS in a subframe n determined according to an Rel-12 operation in each discovery period.

Operation 2: The UE transmits the SLSS every 40 ms in each discovery period. Real SLSS transmission depends on Rel-12 conditions such as a WAN priority. The UE also transmits a PSBCH in a subframe in which the SLSS is transmitted. In this case, the same content as the PSBCH for the UE for performing D2D communication based on Rel-13 may be used.

The Rel-13 UE outside the cell coverage conforms to the operation 2 described above in SLSS transmission when transmitting a type-1 public safety (PS) discovery signal.

The Rel-13 UE inside the cell coverage conforms to the operation 1 for a case of transmitting the discovery signal for a usage other than public safety in SLSS transmission when transmitting a discovery signal. On the other hand, in case of transmitting a discovery signal for a usage of public safety, a base station may configure the operation 1 or the operation 2, and the UE conforms thereto.

A UE which participates in discovery signal transmission for the usage of public safety and which uses the operation 2 transmits SLSS every 40 ms. In this case, the UE may transmit the SLSS continuously whenever there is a discovery message given from a higher layer and to be transmitted in a given carrier.

The UE which participates in discovery signal transmission for the usage of public safety and which uses the operation 2 may reuse PSBCH which is used in D2D communication based on Rel-12. That is, the same content may be included. A UE which uses the operation 1 does not transmit the PSBCH.

Parameters for PSCCH/PSSCH transmission and PSCCH/PSSCH related SLSS transmission for the UE outside the cell coverage may be configured through a pre-defined signal (e.g., SIB).

The following table shows an example of predetermined parameters for a sidelink.

TABLE 6

```
-- ASN1START
SL-Preconfiguration-r12 ::=       SEQUENCE {
     preconfigGeneral-r12              SL-PreconfigGeneral-r12,
     preconfigSync-r12                 SL-PreconfigSync-r12,
     preconfigComm-r12                 SL-PreconfigCommPoolList4-r12,
     ...
}
SL-PreconfigGeneral-r12 ::=       SEQUENCE {
     -- PDCP configuration
     rohc-Profiles-r12                          SEQUENCE {
          profile0x0001-r12                          BOOLEAN,
          profile0x0002-r12                          BOOLEAN,
          profile0x0004-r12                          BOOLEAN,
          profile0x0006-r12                          BOOLEAN,
          profile0x0101-r12                          BOOLEAN,
          profile0x0102-r12                          BOOLEAN,
          profile0x0104-r12                          BOOLEAN
     },
     -- Physical configuration
     carrierFreq-r12                   ARFCN-ValueEUTRA-r9,
     maxTxPower-r12                    P-Max,
     additionalSpectrumEmission-r12    AdditionalSpectrumEmission,
     sl-bandwidth-r12                  ENUMERATED {n6, n15, n25, n50, n75, n100},
     tdd-ConfigSL-r12                  TDD-ConfigSL-r12,
     reserved-r12                      BIT STRING (SIZE (19)),
     ...
}
SL-PreconfigSync-r12 ::=     SEQUENCE {
     syncCP-Len-r12                    SL-CP-Len-r12,
syncOffsetIndicator1-r12               SL-OffsetIndicatorSync-r12,
     syncOffsetIndicator2-r12          SL-OffsetIndicatorSync-r12,
     syncTxParameters-r12              P0-SL-r12,
     syncTxThreshOoC-r12               RSRP-RangeSL3-r12,
     filterCoefficient-r12             FilterCoefficient,
     syncRefMinHyst-r12                ENUMERATED {dB0, dB3, dB6, dB9, dB12},
     syncRefDiffHyst-r12               ENUMERATED {dB0, dB3, dB6, dB9, dB12, dBinf},
     ...
}
SL-PreconfigCommPoolList4-r12 ::=    SEQUENCE (SIZE (1..maxSL-TxPool-r12)) OF SL-PreconfigCommPool-r12
SL-PreconfigCommPool-r12 ::=         SEQUENCE {
-- This IE is same as SL-CommResourcePool with rxParametersNCell absent
     sc-CP-Len-r12                     SL-CP-Len-r12,
     sc-Period-r12                     SL-PeriodComm-r12,
     sc-TF-ResourceConfig-r12          SL-TF-ResourceConfig-r12,
     sc-TxParameters-r12               P0-SL-r12,
     data-CP-Len-r12                   SL-CP-Len-r12,
     data-TF-ResourceConfig-r12        SL-TF-ResourceConfig-r12,
     dataHoppingConfig-r12             SL-HoppingConfigComm-r12,
     dataTxParameters-r12              P0-SL-r12,
     trpt-Subset-r12                   SL-TRPT-Subset-r12,
     ...
}
END
-- ASN1STOP
```

In the above table, 'carrierFreq' indicates a carrier frequency for a sidelink operation. In an FDD case, this indicates an uplink frequency, and its corresponding downlink frequency may be determined by a default TX-RX frequency separation.

'preconfigComm' indicates a list of the number of individual resource pools. This may be used in signal transmission/reception for D2D communication.

'syncRefDiffHyst' is a hysteresis used when a reference UE for synchronization is evaluated using a relative comparison. 'syncRefMinHyst' is a hysteresis used when the reference UE for synchronization is evaluated using an absolute comparison.

For example, a rule may be defined such that a maximum TX power value related to PDSCH transmission of the UE outside the cell coverage (e.g., $P_{CMAX,PSDCH}$) (and/or a maximum TX power value (e.g., $P_{CMAX,PSBCH}$, $P_{CMAX,SSSS}$) related to SLSS transmission associated with corresponding PSDCH) is configured independently (or differently) from a maximum TX power value related to PSCCH (and/or PSSCH) transmission of the UE outside the cell coverage (e.g., $P_{CMAX,PSCCH}$, $P_{CMAX,PSSCH}$) (and/or a maximum TX power value related to SLSS transmission associated with corresponding PSCCH (and/or PSSCH) (e.g., $P_{CMAX,PSBCH}$, $P_{CMAX,SSSS}$)).

Herein, for example, this rule may be applied limitedly only for a case where parameters for PSDCH transmission (and/or SLSS transmission associated with corresponding PSDCH) of the UE outside the cell coverage are configured through independent (or different) signaling (e.g., SIB) from parameters for PSCCH (and/or PSSCH) transmission of the UE (and/or SLSS transmission associated with corresponding PSCCH (and/or PSSCH)).

Herein, for example, in the proposed rule, the "maximum TX power value" can be extensively interpreted as an "open-loop power control parameter value (e.g., $P_O$, alpha)".

For another example, a rule may be defined such that a maximum TX power value related to public safety (PS) PSDCH transmission of the UE inside the cell coverage (e.g., $P_{CMAX,PSDCH}$) (and/or a maximum TX power value related to SLSS transmission associated with corresponding PS PSDCH (e.g., $P_{CMAX,PSBCH}$, $P_{CMAX,SSSS}$)) is configured independently (or differently) from a maximum TX power value related to non-PS PSDCH transmission of the UE inside the cell coverage (e.g., $P_{CMAX,PSDCH}$) (and/or a maximum TX power value related to SLSS transmission associated with corresponding non-PS PSDCH (e.g., $P_{CMAX,PSBCH}$, $P_{CMAX,SSSS}$)). That is, it may be interpreted that the maximum TX power value varies depending on a discovery type.

In the proposed rule, the "maximum TX power value" may be extensively interpreted as an "open-loop power control parameter value (e.g., $P_O$, alpha)".

For another example, a rule may be defined such that a maximum TX power value related to relay PDSCH transmission (e.g., $P_{CMAX,PSDCH}$) (and/or a maximum TX power value related to SLSS transmission associated with corresponding relay PSDCH (e.g., $P_{CMAX,PSBCH}$, $P_{CMAX,SSSS}$)) is configured independently (or differently) from a maximum TX power value related to non-relay PDSCH (or non-PS PSDCH or member PDSCH belonging to group) transmission (e.g., $P_{CMAX,PSDCH}$) (and/or a maximum TX power value related to SLSS transmission associated with corresponding non-relay PSDCH (or non-PS PSDCH or member PSDCH belonging to group) (e.g., $P_{CMAX,PSBCH}$, $P_{CMAX,SSSS}$)). That is, it may be interpreted that the maximum TX power value varies depending on a discovery type.

In the proposed rule, the "maximum TX power value" may be extensively interpreted as an "open-loop power control parameter value (e.g., $P_O$, alpha)".

For another example, a UE which performs a D2D operation is allowed to apply PSDCH maximum TX power signaled (e.g., SIB or dedicated RRC signal) from a base station (and/or SLSS maximum TX power (associated with corresponding PSDCH)) to PDSCH inside the cell coverage (and/or an SLSS (associated with corresponding PSDCH)) when located inside the cell coverage, and to apply a maximum TX power value corresponding to a (pre-defined (or signaled)) greatest target range to PSDCH outside the cell coverage (and/or SLSS (associated with corresponding PSDCH)) in the absence of a field related to maximum TX power on pre-defined signaling (e.g., SIB) when located outside the cell coverage. On the other hand, a rule may be defined such that a corresponding value is applied to the PSDCH outside the cell coverage (and/or SLSS (associated with corresponding PSDCH)) in the presence of the field related to the maximum TX power on the pre-defined signaling (e.g., SIB).

For another example, the UE which performs the D2D operation may be configured to determine maximum TX power of corresponding SLSS transmission according to some (or all) of priorities described below, when SLSS transmissions triggered from different types of discovery (or PSDCH) transmissions overlap at the same time point.

Herein, for example, the some (or all) of rules described above may be limitedly applied only to a UE which performs a D2D operation inside the cell coverage (and/or a UE which performs the D2D operation outside the cell coverage and/or a UE which performs the D2D operation for a relay role and/or a separated UE).

Further, for example, if the SLSS transmissions triggered from the different types of discovery (or PSDCH) transmissions do not overlap at the same time point, it may be defined to conform to each associated, predetermined (or signaled) discovery maximum TX power value.

Further, for example, a base station may be configured such that which one will be applied among priority rules described below is announced to the UE through pre-defined signaling (e.g., SIB (a UE in an RRC_IDLE state, a UE outside the cell coverage), a dedicated signal (a UE in an RRC_CONNECTED state)). In the present proposed method, "SLSS" may be interpreted, for example, as PSBCH (and/or PSSS (ad/or SSSS)).

Example #1

When SLSS transmission triggered for PS discovery signal transmission overlaps with SLSS transmission triggered for non-PS discovery signal transmission at the same time point, a rule may be defined such that maximum TX power of corresponding SLSS is predetermined or conforms to maximum TX power for a signaled PS discovery signal (or maximum TX power for a non-PS discovery signal).

Example #2

When SLSS transmission triggered for discovery of a relay operation overlaps with SLSS transmission triggered for discovery of a non-relay operation at the same time point, a rule may be defined such that maximum TX power of corresponding SLSS is predetermined or conforms to maximum TX power for discovery of a signaled relay operation (or maximum TX power for discovery for the non-relay operation). For another example, the SLSS transmission triggered for the discovery of the relay operation overlaps with SLSS transmission triggered for the discovery of a group member (or non-PS) at the same time point, a rule may be defined such that maximum TX power of corresponding SLSS is predetermined or conforms to maximum TX power of the discovery of the signaled relay operation (or maximum TX power of the discovery of the group member (or non-PS)).

For another example, the UE which performs the D2D operation may be configured to determine maximum TX power of corresponding SLSS transmission according to some (or all) of priorities described below, when SLSS transmission triggered from discovery (or PSDCH) transmission overlaps with SLSS transmission triggered from D2D communication (or PSCCH (and/or PSSCH)) at the same time point.

Herein, for example, the some (or all) of rules described above may be limitedly applied only to a UE which performs a D2D operation inside the cell coverage (and/or a UE which performs the D2D operation outside the cell coverage and/or a UE which performs the D2D operation for a relay role and/or a separated UE).

Further, a rule may be defined such that a UE which performs a D2D operation is allowed to conform to each associated predetermined (or signaled) (discovery/D2D communication) maximum TX power value, when SLSS transmission triggered from discovery (or PSDCH) transmission does not overlap with SLSS transmission triggered from D2D communication (or PSCCH (and/or PSSCH)) transmission at the same time point.

Further, for example, which one will be applied among priority rules described below may be configured to a UE by a base station. In this case, the base station may use defined signaling. An SIB may be used for a UE outside the cell coverage, and a dedicated signal may be used for a UE in an RRC_CONNECTED state. In the present proposed method, the term "SLSS" may be interpreted, for example, as PSBCH (and/or PSSS (ad/or SSSS)).

Example #3

When SLSS transmission triggered by (PS (or non-PS) or relay or group member) discovery overlaps with SLSS transmission triggered for D2D communication at the same time point, a rule may be defined such that maximum TX power of corresponding SLSS conforms to predetermined (or signaled) (PS (or non-PS) or relay or group member) discovery maximum TX power (or D2D communication maximum TX power).

Examples for the aforementioned proposed method may also be included as one of methods for implementing the present invention, and thus can be apparently regarded as a sort of proposed methods. Further, the aforementioned proposed methods may be implemented independently, or may also be implemented in a combined (or merged) form of some of the proposed methods.

A rule may be defined such that the aforementioned proposed methods are applied limitedly only under an environment of an FDD system (and/or TDD system). A rule may be defined such that the aforementioned proposed methods are applied limitedly only to mode-2 D2D communication and/or type-1 discovery (and/or mode-1 D2D communication and/or type-2 discovery).

Further, a rule may be defined such that the aforementioned proposed methods are applied limitedly only to a UE which performs a D2D operation inside the cell coverage (and/or a UE which performs the D2D operation outside the cell coverage) (and/or a UE which performs the D2D operation in an RRC_CONNECTED state (and/or a UE which performs the D2D operation in the RRC_CONNECTED state)). A rule may be defined such that the aforementioned proposed methods are applied limitedly only to a D2D UE which performs only a D2D discovery (TX(/RX)) operation (and/or a D2D UE which performs only a D2D communication (TX(/RX)) operation).

A rule may be defined such that the aforementioned proposed methods are applied limitedly only to a scenario in which only D2D discovery is supported (configured) (and/or a scenario in which only D2D communication is supported (configured)).

A rule may be defined such that the aforementioned proposed methods are applied limitedly only to a case of performing an operation of receiving a D2D discovery signal in different (UL) carriers on an inter-frequency (and/or a case of performing an operation of receiving a D2D discovery signal in different PLMN (UL) carriers based on inter-PLMN).

Further, for example, a rule may be defined such that the aforementioned proposed methods are applied limitedly only to a case (or time) in which SLSS/PSBCH transmitted in one subframe are simultaneously triggered by D2D communication and D2D discovery, when a UE transmits both of D2D communication and D2D discovery signals.

Figure 21:
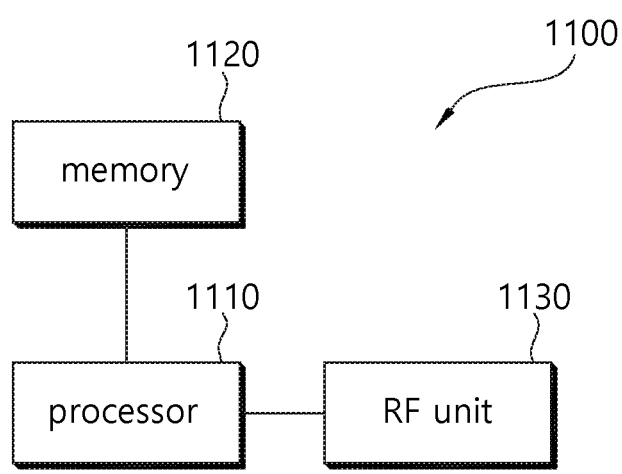
FIG. 21 is a block diagram showing a UE according to an embodiment of the present invention.

FIG. 21 is a block diagram showing a UE according to an embodiment of the present invention.

Referring to FIG. 21, a UE 1100 includes a processor 1110, a memory 1120, and a radio frequency (RF) unit 1130. The processor 1110 implements the proposed functions, procedures, and/or methods. For example, the processor 1110 may receive power information discMaxTxPower for D2D discovery signal transmission, and may determine transmit power PPSDCH for the D2D discovery signal transmission on the basis of the power information discMaxTxPower. Further, the processor 1110 may determine TX power for SLSS and PSBCH, and transmits the SLSS and the PSBCH with the determined TX power. If transmission of the SLSS and the PSBCH is triggered simultaneously for both of D2D discovery and D2D communication, the TX power for the SLSS and the PSBCH may be determined on the basis of power information P-Max for the D2D communication.

The RF unit 1130 is connected to the processor 1110, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

What is claimed is:

1. A method for transmitting a sidelink discovery signal in a wireless communication system, the method is performed by a user equipment (UE) and comprising:
    setting a transmit power for the sidelink discovery signal; and
    transmitting the sidelink discovery signal with the transmit power,
    wherein the transmit power is determined based on discMaxTxPower, and
    wherein based on the UE being configured with a range class, the discMaxTxPower informs a parameter used to calculate a maximum transmit power of the UE configured with the range class.

2. The method of claim 1, wherein the range class is any one of short, medium and long.

3. The method of claim 1, wherein the discMaxTxPower is separately provided for each range class configured for the UE.

4. The method of claim 1, further comprising:
    receiving the discMaxTxPower from a base station.

5. The method of claim 4, wherein the UE transmits the sidelink discovery signal to another UE in a cell coverage of the base station.

6. A user equipment (UE) comprising:
    a transceiver configured to transmit and receive a radio signal; and
    a processor operatively coupled to the transceiver,
    wherein the processor is configured to:
    set a transmit power for a sidelink discovery signal, and
    transmit the sidelink discovery signal with the transmit power,
    wherein the transmit power is determined based on discMaxTxPower, and
    wherein based on the UE being configured with a range class, the discMaxTxPower informs a parameter used to calculate a maximum transmit power of the UE configured with the range class.

7. The UE of claim 6, wherein the range class is any one of short, medium and long.

8. The UE of claim 6, wherein the discMaxTxPower is separately provided for each range class configured for the UE.

9. The UE of claim 6, wherein the processor receives the discMaxTxPower from a base station.

10. The UE of claim 9, wherein the UE transmits the sidelink discovery signal to another UE in a cell coverage of the base station.

* * * * *